July 14, 1953 T. R. SMITH 2,645,108
COMBINED WASHING MACHINE AND CENTRIFUGAL FLUID EXTRACTOR
Filed Dec. 20, 1948 12 Sheets-Sheet 1

INVENTOR.
Thomas R. Smith,
BY
Wilkinson, Huxley, Byron & Hume
Attys

July 14, 1953      T. R. SMITH      2,645,108
COMBINED WASHING MACHINE AND CENTRIFUGAL FLUID EXTRACTOR
Filed Dec. 20, 1948      12 Sheets-Sheet 2
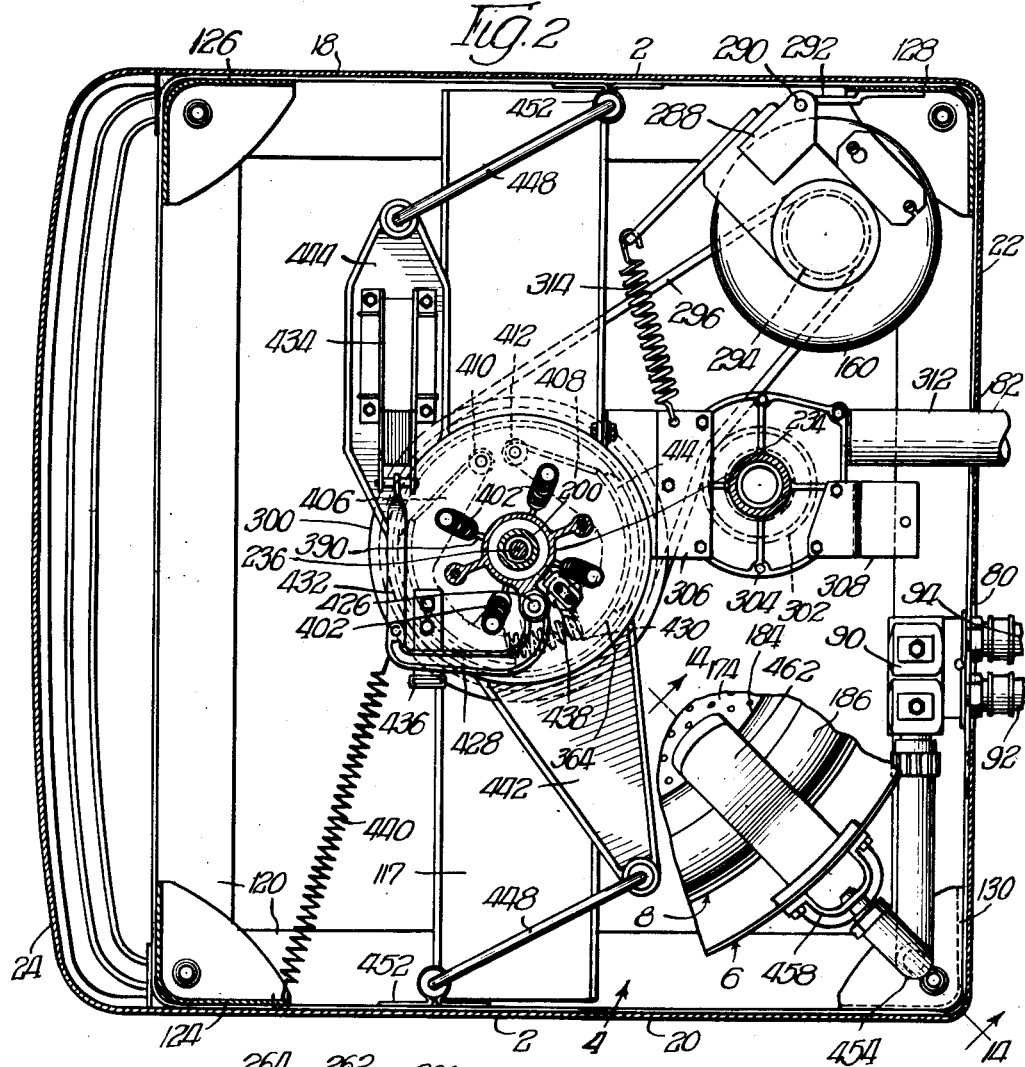
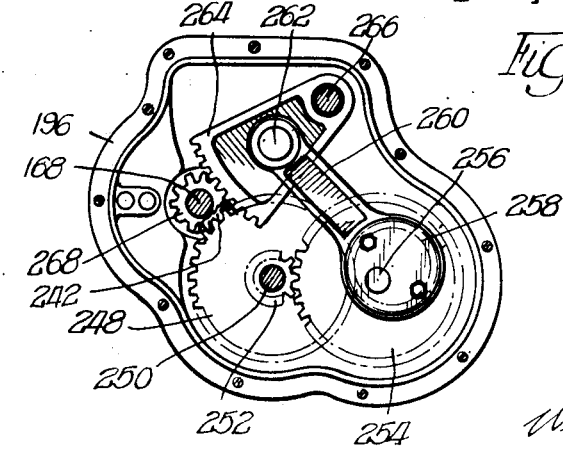
INVENTOR.
Thomas R. Smith,
BY
Wilkinson, Huxley, Byron & Hume
Attys.

July 14, 1953        T. R. SMITH        2,645,108
COMBINED WASHING MACHINE AND CENTRIFUGAL FLUID EXTRACTOR
Filed Dec. 20, 1948        12 Sheets-Sheet 3

INVENTOR.
Thomas R Smith,
BY
Wilkinson, Huxley, Byron + Hume
attys.

July 14, 1953 T. R. SMITH 2,645,108
COMBINED WASHING MACHINE AND CENTRIFUGAL FLUID EXTRACTOR
Filed Dec. 20, 1948 12 Sheets-Sheet 4

INVENTOR.
BY Thomas R. Smith,
Wilkinson, Huxley, Byron & Hume
Attys.

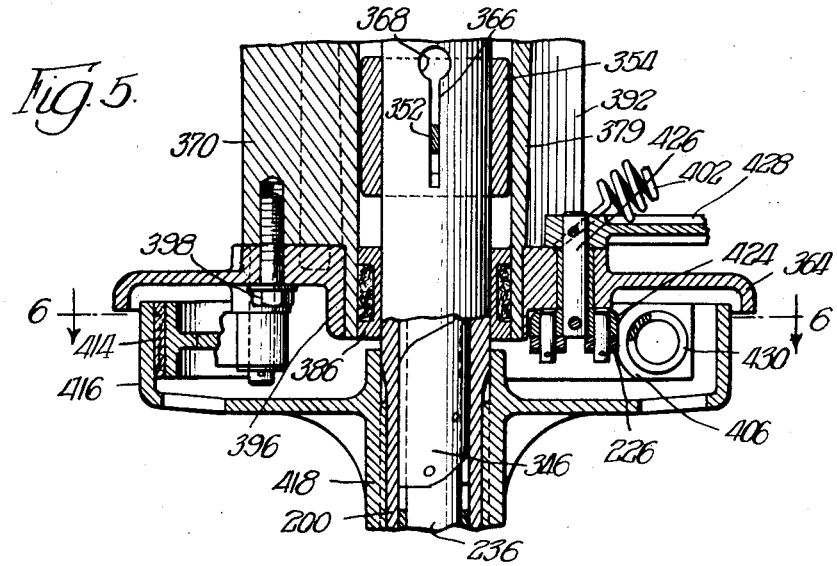
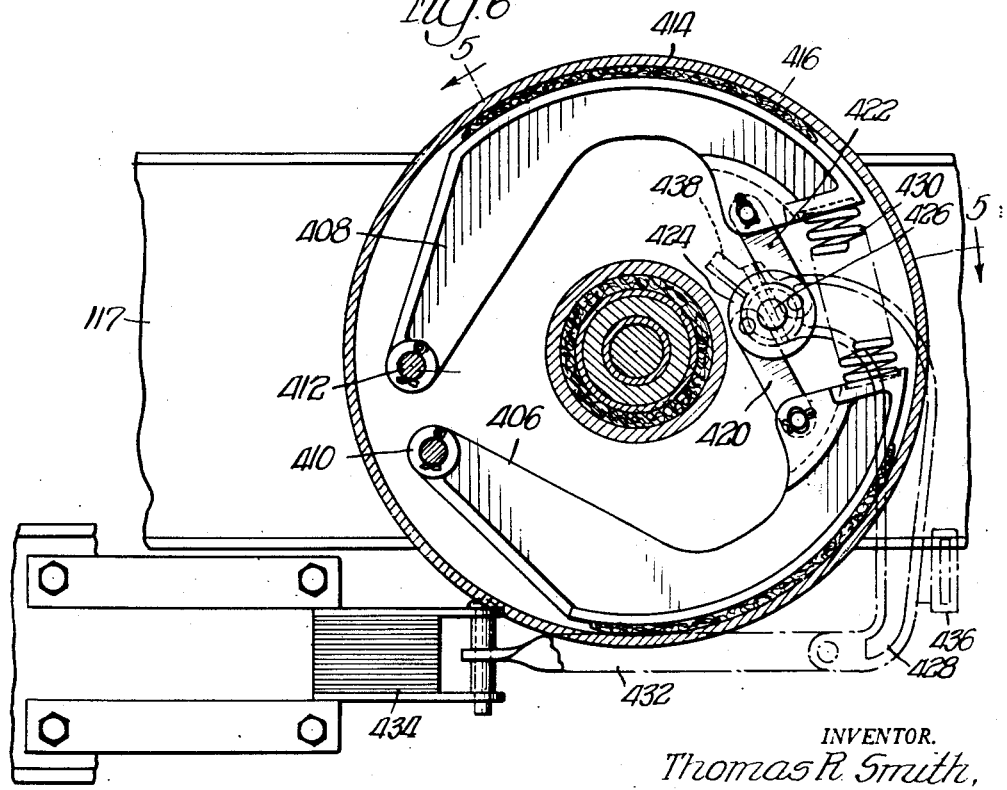

July 14, 1953 T. R. SMITH 2,645,108
COMBINED WASHING MACHINE AND CENTRIFUGAL FLUID EXTRACTOR
Filed Dec. 20, 1948 12 Sheets-Sheet 6
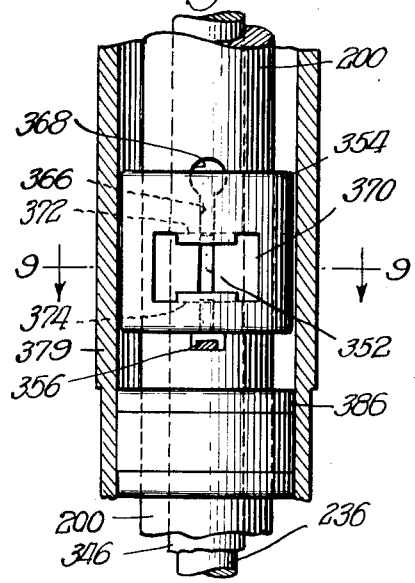
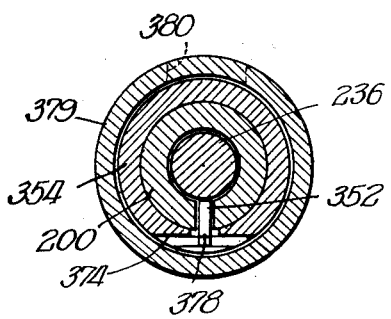
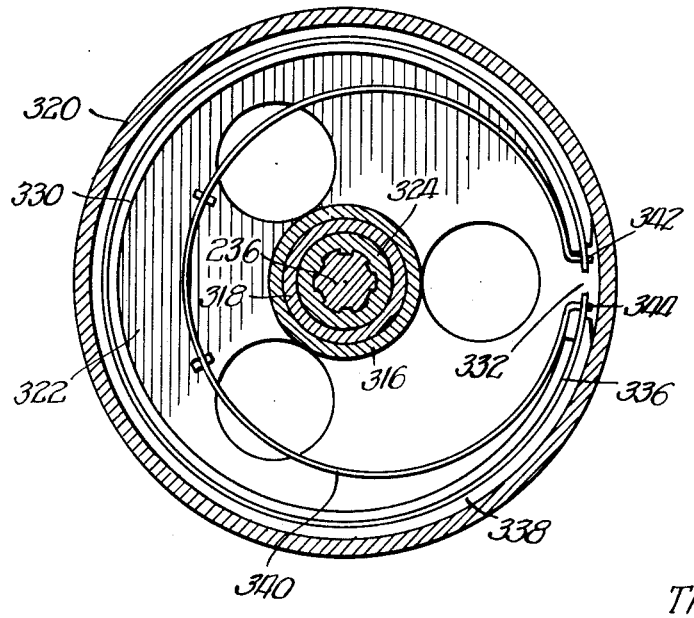
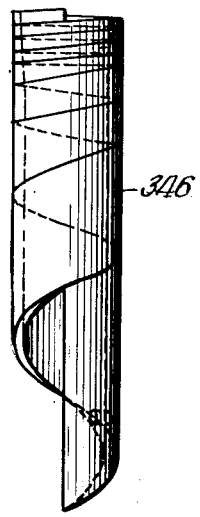
INVENTOR.
Thomas R Smith,
BY

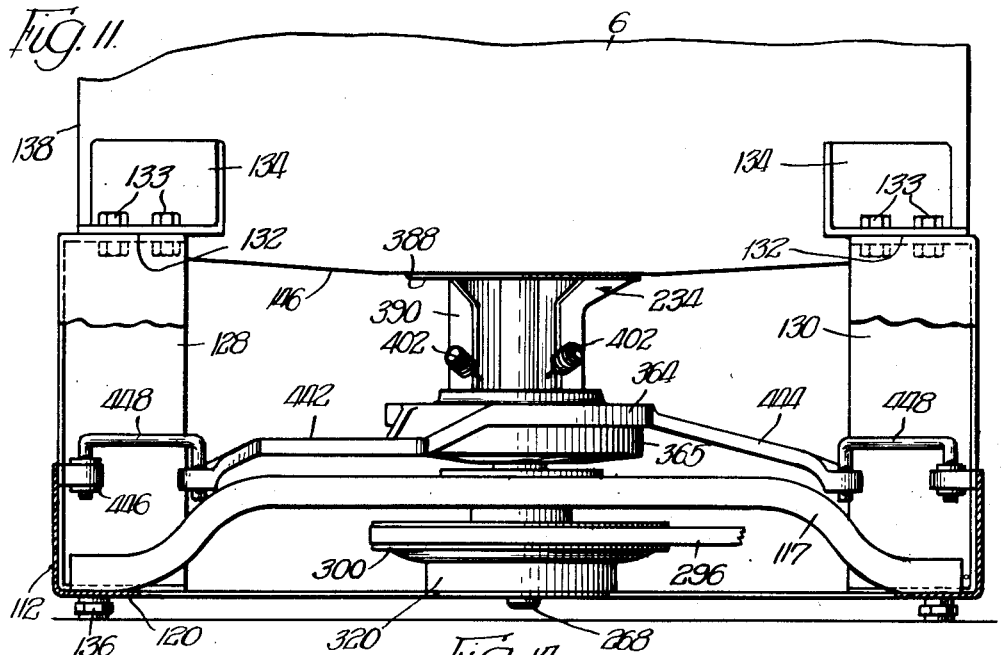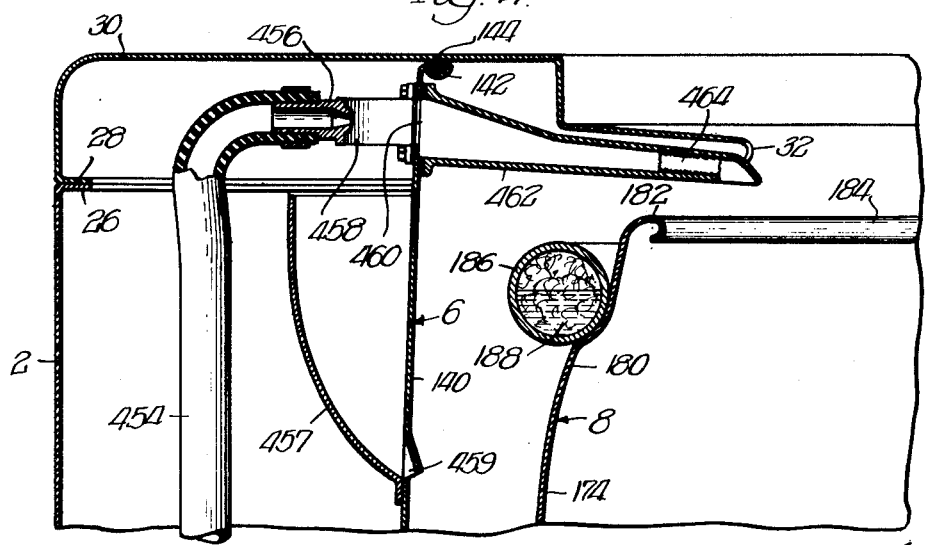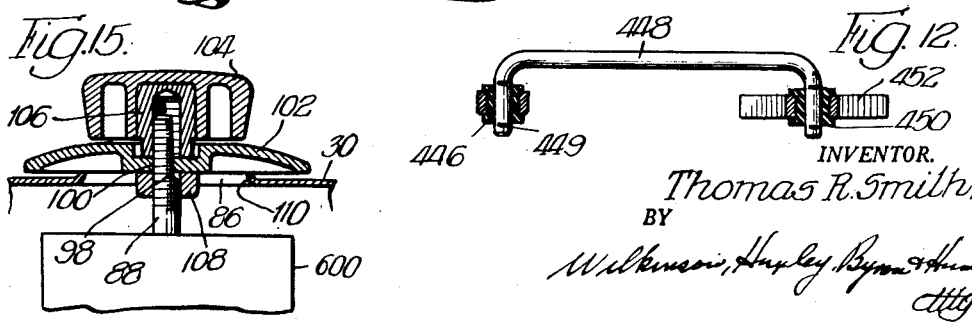

July 14, 1953 T. R. SMITH 2,645,108
COMBINED WASHING MACHINE AND CENTRIFUGAL FLUID EXTRACTOR
Filed Dec. 20, 1948 12 Sheets-Sheet 8

INVENTOR.
Thomas R. Smith,
BY
Wilkinson, Huxley, Byron Hume
ATTORNEYS.

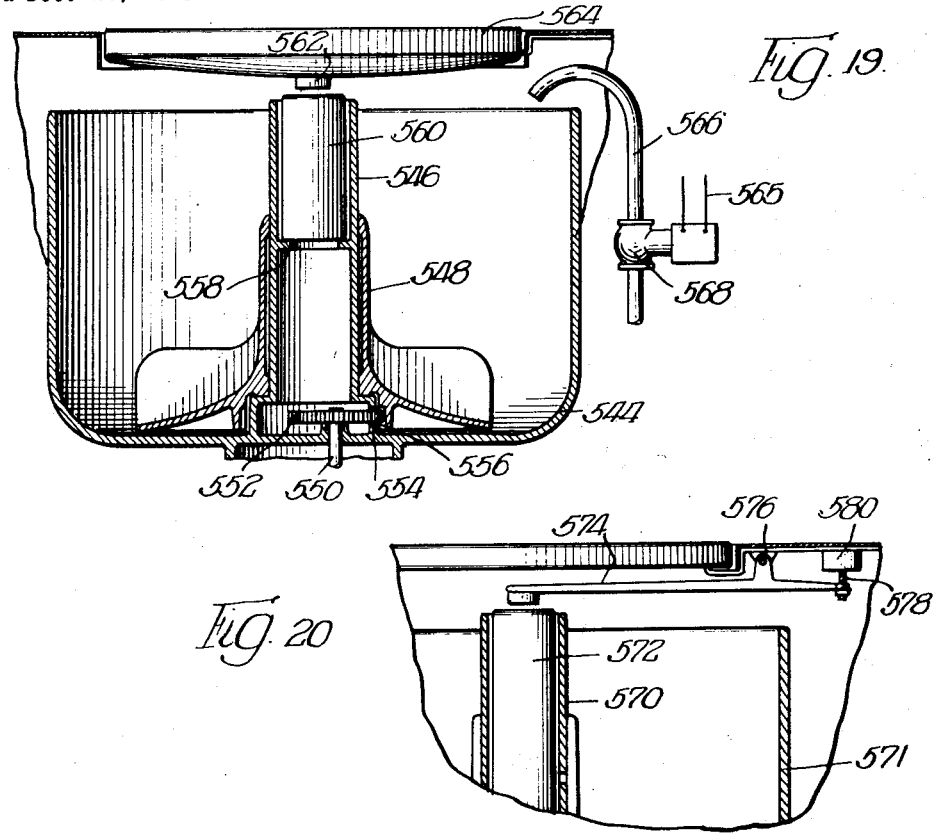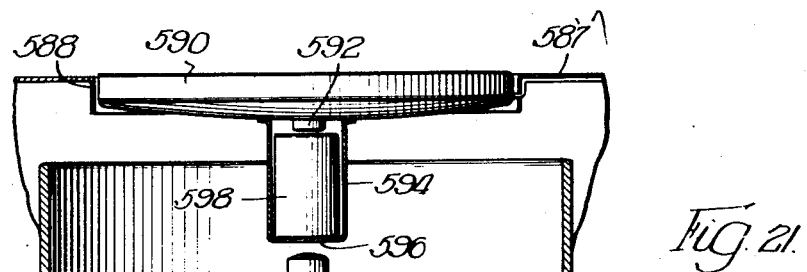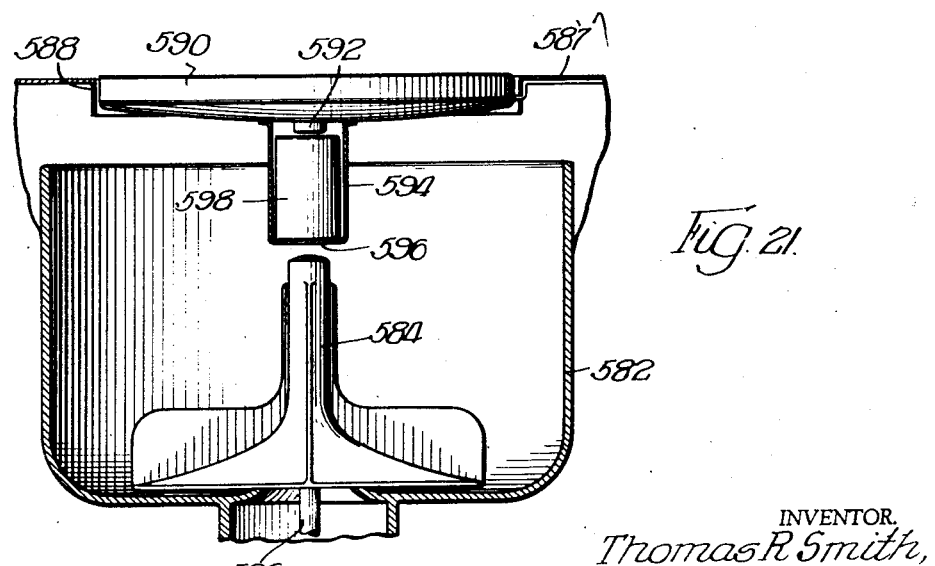

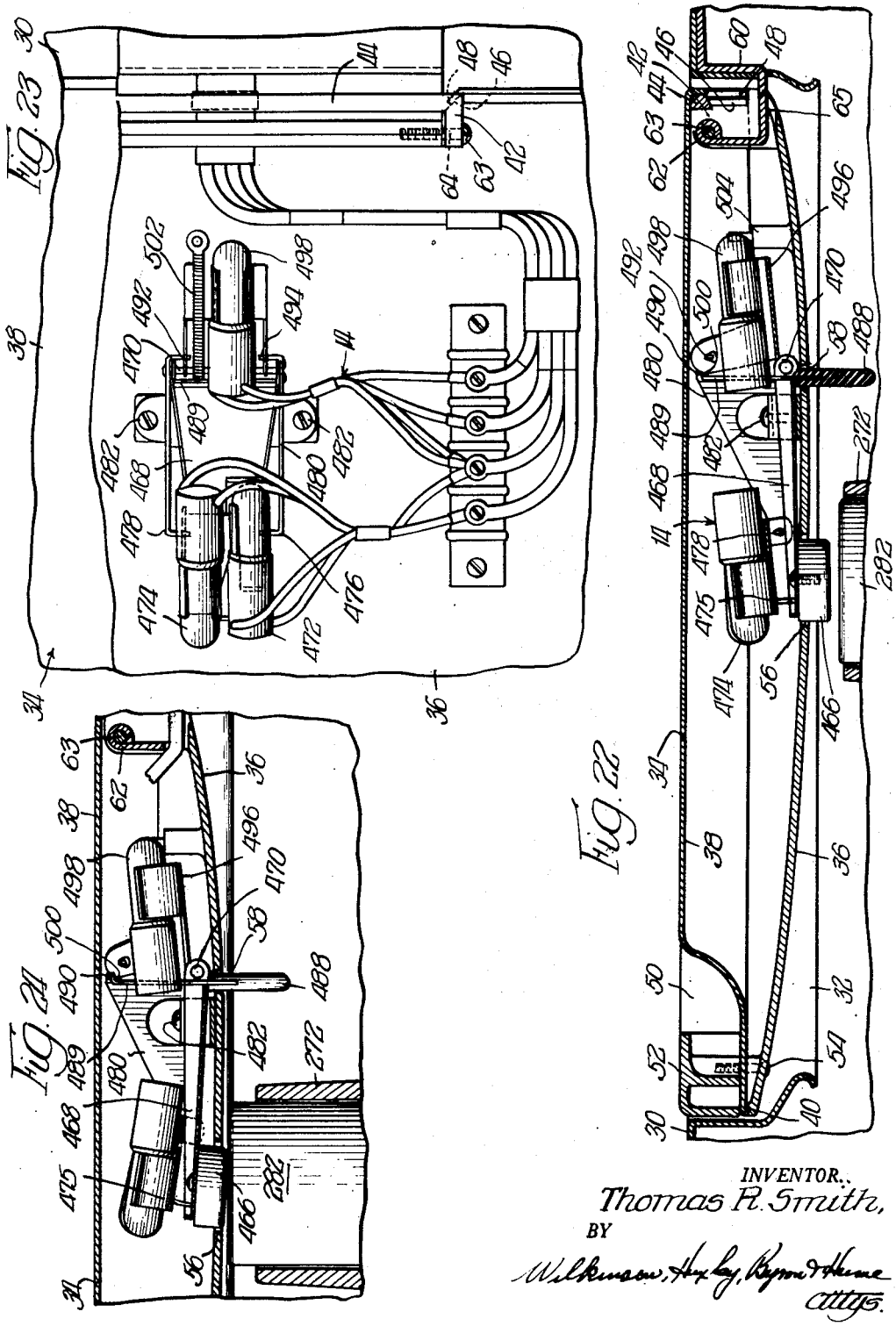

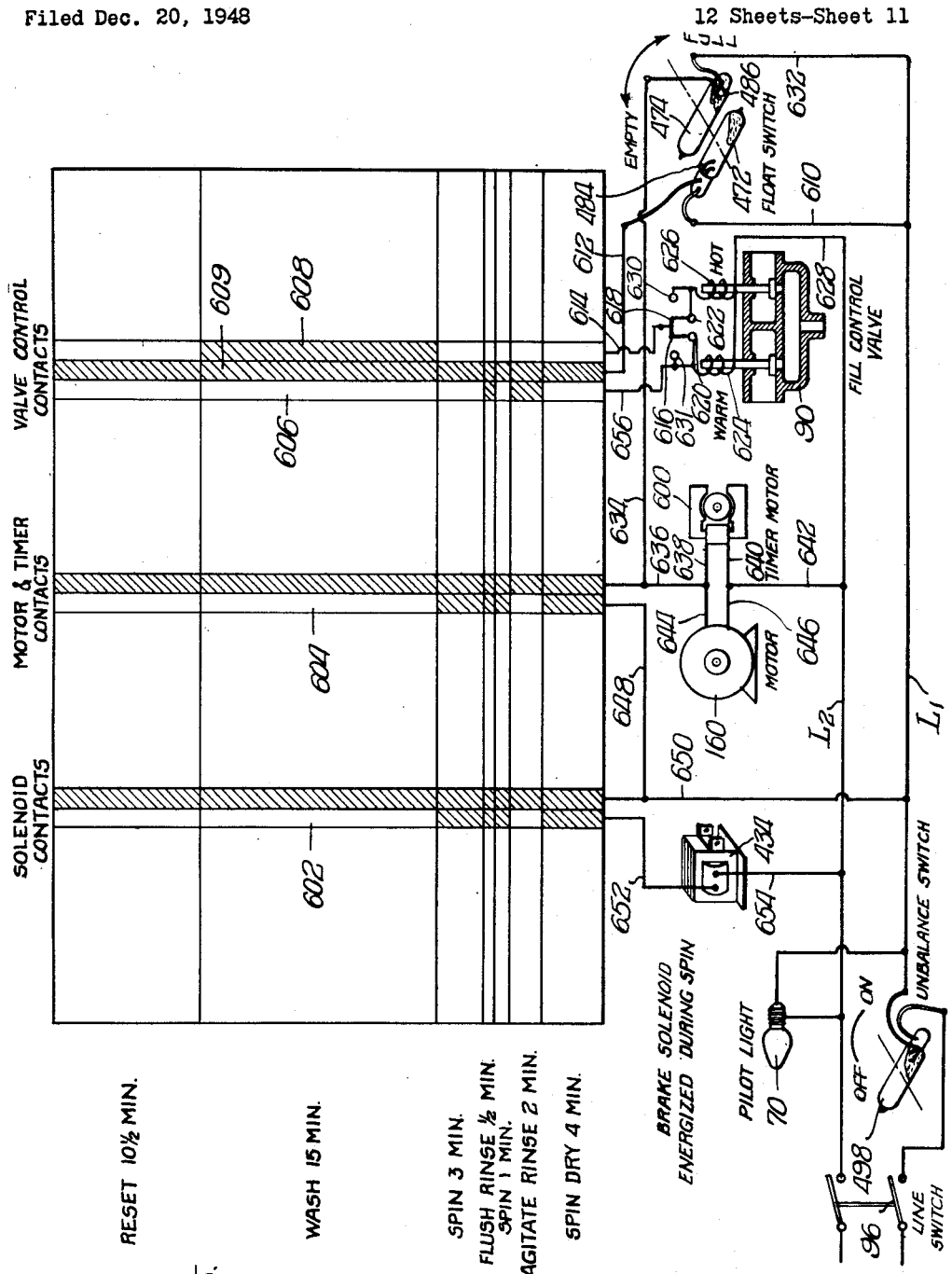

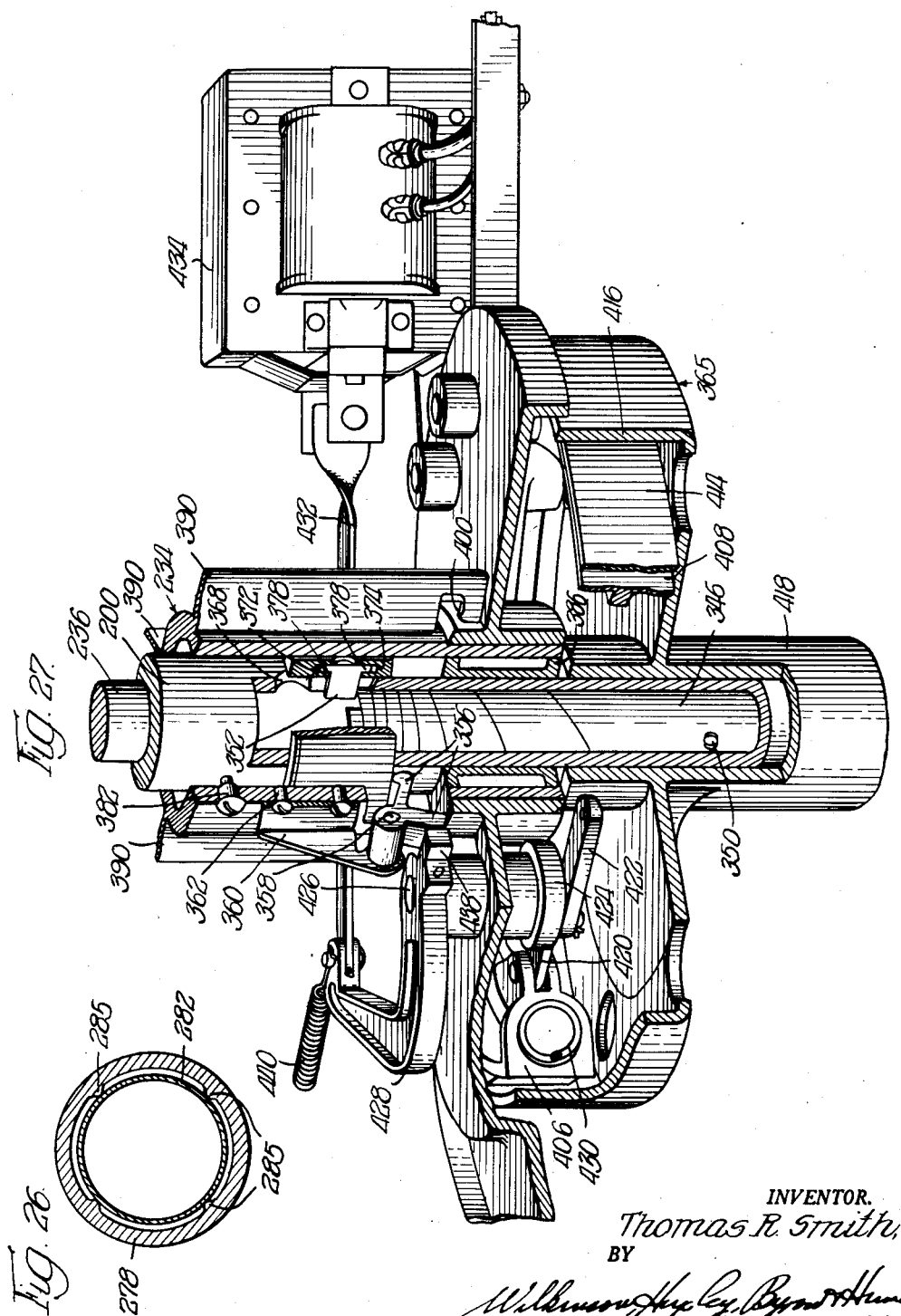

Patented July 14, 1953

2,645,108

UNITED STATES PATENT OFFICE 2,645,108

COMBINED WASHING MACHINE AND CENTRIFUGAL FLUID EXTRACTOR

Thomas R. Smith, Newton, Iowa, assignor to The Maytag Company, Newton, Iowa, a corporation of Delaware Application December 20, 1948, Serial No. 66,230

29 Claims. (Cl. 68—23)

The present invention relates to washing machines, and more particularly to washing machines of the type in which a washing operation is accomplished by agitating the liquid and material contained therein and in which the tub is thereafter rotated to extract the liquid from the material to effect a partial drying thereof. This application is a companion to my copending application Serial No. 66,229, filed of even date herewith, for Combined Washing Machine and Centrifugal Extractor.

Among the objects of the present invention is to provide a washing machine of the type specified in which the washing cycle, including the washing of the material, the rinsing thereof, and the extracting of liquid therefrom is automatically controlled.

Another object of the invention is to provide a washing machine which is relatively simple in construction with relatively few moving parts, and in which the rotating tub assembly is supported for operation by a single bearing, thus providing a device which is readily and easily maintained in operating condition at a relatively low cost.

Still another object of the present invention is to provide a washing machine of the type immedaitely hereinabove described in which an efficient and effective driving means is incorporated in the structure for operating the washing device within the tub and for rotating or spinning the tub assembly for drying the material contained in the tub. More particularly, the former driving means involves the provision of oscillating mechanism associated with the bottom of the tub which not only recommends itself as a desirable location because of space requirements and ease of access but which at the same time constitutes additional weight which is so located with respect to the mounting for the tub as to greatly facilitate bringing the tub assembly up to spinning speeds without excessive gyratory movement of the tub even though the loadings in the tub are eccentrically disposed. With respect to the latter drive means, novel clutch mechanism and control means therefor is provided whereby the spinning operation can be performed smoothly and without interruption at spaced timed intervals in accordance with a predetermined program of operation for the machine.

A still further object of the present invention is to provide a washing machine of the type herein contemplated in which means is provided to dampen out and control eccentric loadings in the rotating tub, whereby vibrations and other deteriorating forces which would otherwise normally be set up in such an assembly are reduced to a minimum.

The present invention is further characterized by the provision of brake means for applying a braking force to the tub assembly which is disposed above and in spaced relation to the support for the tub assembly and which has means associated therewith to prevent torsional movement of the brake means during its operation irrespective of the gyratory movement of the tub assembly about its support.

Still another object of the invention is to provide a washing machine of the type described in which the clutch mechanism, brake means and damper means are compactly and conveniently arranged for ready accessibility to facilitate adjustments, and repair or replacement of parts, such assembly having a common operating means for the brake means and clutch mechanism.

A still further object of the invention is to provide novel control means for automatically and consecutively causing the washing machine to perform steps in a washing operation in timed sequence which may involve the introduction of washing liquid, agitating the clothes or material to be washed, rinsing and spin drying, such control means embodying a float member as one of its novel features which is carried by a supporting structure, centrally disposed in said tub and is operated by the liquid therein. The invention comprehends the provision of control mechanism operated by said float member which preferably is carried by the lid for the washing machine.

A further novel aspect of the invention resides in the provision of a control means which initiates the agitation of the clothes in the washing cycle at a desired time interval before a predetermined liquid level in the tub is attained, thus providing a smooth and undisturbed overlapping transitional period between the time when agitation of the clothes is initiated and the time when the liquid supply is rendered inoperative, thus eliminating any tendency of the washing machine to "hunt" during this period in its cycle of operation.

Another object of the invention is to provide a novel lid construction which, as one of its attributes, facilitates the mounting and servicing of such control mechanism therein.

A further object of the invention is to provide a novel liquid-tight seal between the tub assembly and an outer stationary tub which is effective under all operating conditions encountered in the washing machine to prevent passage of moisture into the compartment below said outer tub.

Still another object of the present invention is to provide a novel liquid inlet means embodying an air gap to prevent the return of dirty water or other contaminating material from the washing machine into the supply system in the event of a drop in pressure in said system and which further incorporates means to assure a soft non-splashing flow of liquid from said system into the washing machine.

A further desideratum of the invention is to provide a novel cabinet and base structure whereby access to the operating mechanisms is readily obtained for adjustment, repair or replacement of parts.

Other objects, features, capabilities and advantages are comprehended by the invention, as will later appear and as are inherently possessed thereby.

Referring to the drawings:

Figure 2 is a horizontal cross-sectional view taken generally in a plane represented by line 2—2 of Figure 1 of the drawings;

Figure 5 is a view similar to Figure 4 taken in a plane represented by line 5—5 of Figure 6 of the drawings;

Figure 6 is a horizontal cross-sectional view taken in the planes represented by lines 6—6 of Figure 5 of the drawings;

Figure 7 is a view in horizontal cross-section taken in the plane of lines 7—7 of Figure 4 of the drawings;

Figure 8 is an enlarged vertical cross-sectional view of the control means for the clutch for the driving mechanism shown in Figures 4 and 5 of the drawings;

Figure 9 is a horizontal cross-sectional view taken in the plane represented by line 9—9 of Figure 8 of the drawings;

Figure 10 is a view in elevation of the spring clutch element for the driving mechanism more particularly shown in Figure 4 of the drawings;

Figure 11 is an enlarged fragmentary view in elevation of the lower portion of the washing machine assembly;

Figure 12 is a view disclosing one of the brake stabilizer links and its mounting;

Figure 13 is a horizontal cross-sectional view of the oscillating mechanism taken in the plane represented by line 13—13 of Figure 1 of the drawings;

Figure 14 is an enlarged fragmentary view in vertical cross-section taken in the plane represented by line 14—14 of Figure 2 of the drawings;

Figure 15 is a fragmentary view in vertical cross-section of a control device for the washing machine;

Figure 1:
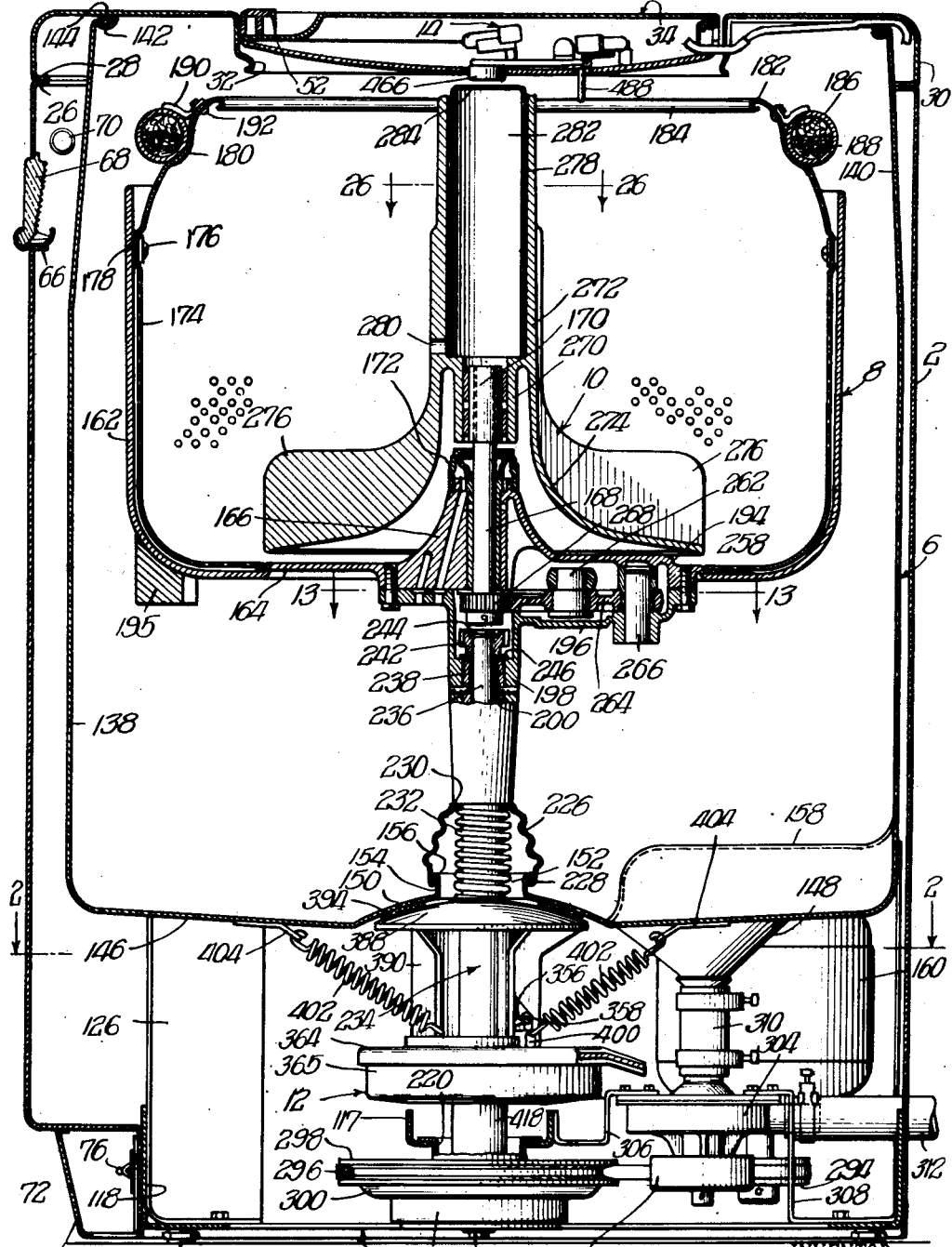
Figure 1 is a vertical cross-sectional view of a washing machine made in accordance with the present invention.

Figures 16 to 21, inclusive, are enlarged fragmentary views, partly in elevation and partly in section, disclosing various modifications of the float control for controlling the operation of the washing machine;

Figure 22 is an enlarged fragmentary view in vertical section of the upper part of the washing assembly, disclosing more in particular the float control and associated control switches mounted in the lid of the washing machine;

Figure 23 is an enlarged fragmentary plan view of the switch control mechanism mounted in the lid as shown in Figure 22 of the drawings;

Figure 24 is a fragmentary view in cross-section similar to Figure 22 but more particularly disclosing the float and switch control assembly in another operative position;

Figure 25 is a diagrammatic disclosure of the control circuit for the washing machine;

Figure 26 is a view in cross-section taken in a plane represented by line 26—26 of Figure 1 of the drawings; and Figure 27 is a partial sectional perspective view of the brake and clutch mechanisms embodied in the automatic washer.

Referring now more in detail to the drawings, a combined washing and drying machine made in accordance with the present invention is shown as generally comprising an outer cabinet 2, a base structure 4 for supporting an outer tub 6 completely enclosed by the cabinet 2. Mounted within the outer tub 6 is a rotatable tub 8 provided with an agitator or washing device 10 therein, the tub 8 and its agitator or washing device 10 being operated by suitable mechanism 12 which, together with the inner tub and agitator assembly, are suitably supported on the base structure 4. As a further characteristic of the washing machine, a control mechanism, generally referred to as 14, is provided for automatically controlling certain operations in the washing cycle.

Figure 3:
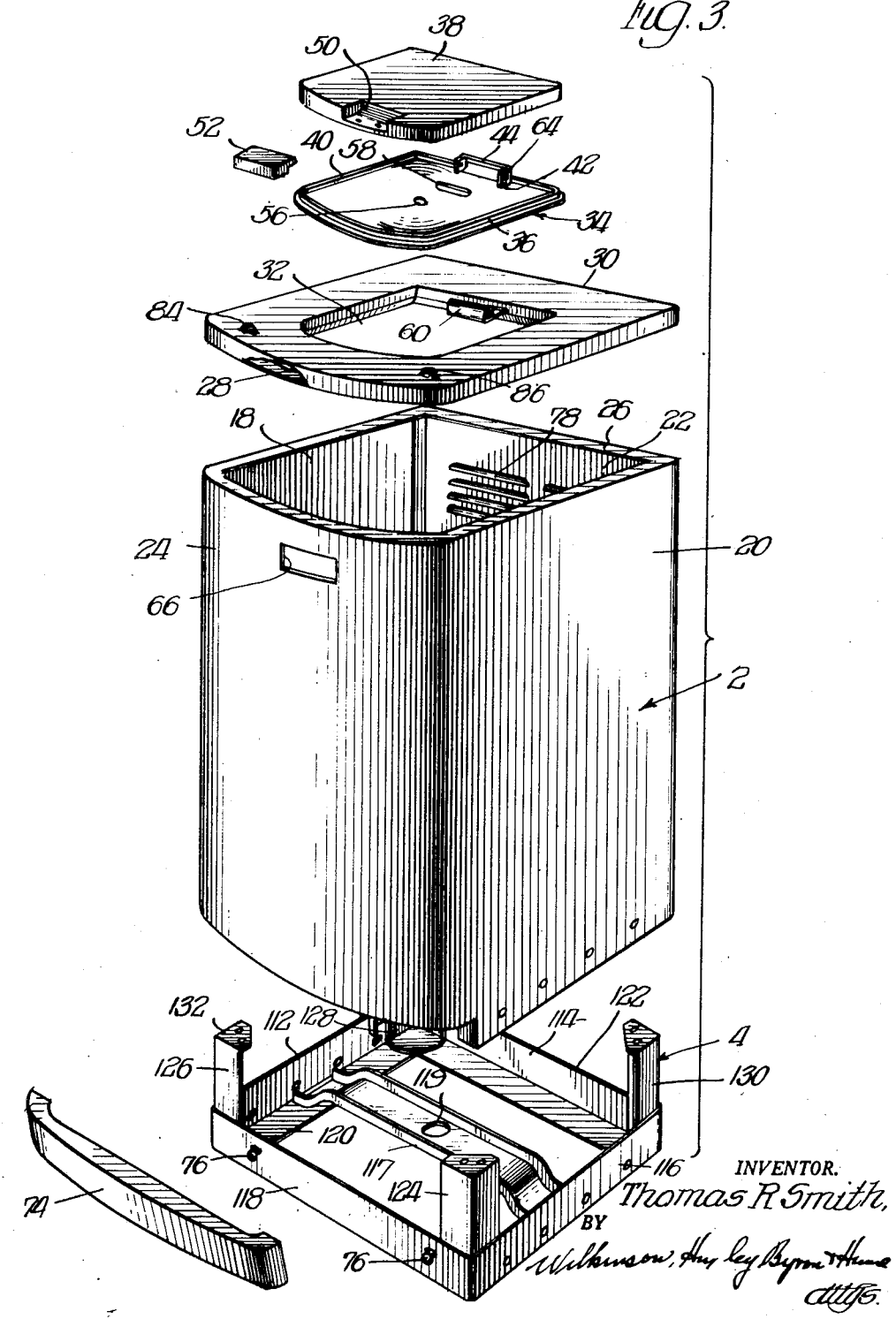
Figure 3 is an exploded view in perspective of the base and cabinet for the washing machine shown in Figures 1 and 2 of the drawings.

The cabinet 2, more particularly disclosed in Figure 3 of the drawings, has its main body formed from sheet metal to provide the opposite side panels 18 and 20 and the back and front panels 22 and 24 which may be formed separately and welded at the corners to provide a substantially rectangular unitary structure, or one or more of these panels may be formed from a single piece suitably bent, and welded, or otherwise secured to the remaining panels to provide the said unitary structure. The panels are formed with inturned flanges 26 at the upper edges thereof which are adapted to mate with and be secured to similar flanges 28 of the cover or top panel 30 for the cabinet. This cover or top panel 30 is formed with an opening 32 whereby access may be had to the interior of the rotatable tub 8.

The opening 32 is normally closed by a lid 34 formed with a base section 36 and a cover section 38 to provide a chamber or compartment for a plurality of switch assemblies for the control mechanism 14, as will be hereinafter more fully described. Each of the sections 36 and 38 is formed with interfitting flanges, such as 40, at the marginal edges thereof which are adapted to be disposed to form a unitary lid structure. As shown more particularly in Figures 3 and 22, the base section 36 is provided with a hinge bracket disposed adjacent the rear edge thereof which comprises the upstanding and oppositely disposed lugs 42 interconnected adjacent the top and rear edge thereof by the transversely disposed bar 44 having a lower wedge surface 46 adjacent the oppositely disposed lugs 42. The rear portion of the top or cover section 38 is formed adjacent its rear edge with spaced lugs 48 extending inwardly from the flange 40 which are adapted to be brought into wedging relation to the wedge surfaces 46 for holding the wall sections 36 and 38 of the lid together at this point when moved angularly with respect to one another into assembled relation. The top wall section 38 is formed adjacent the front thereof with a recess 50 adapted to receive a handle 52 which can be gripped by the operator for swinging the lid about its pivot point into and out of its closed position. The two wall sections 36 and 38 are held in assembled relation by means of a pair of screws 54, or the like, which extend through aligned openings provided in the wall sections 36 and 38 and threadedly engage the handle 52 for securing the same within the recess 50. It is apparent that the screws 54 may be readily removed and the wall sections 36 and 38 moved apart for readily gaining access to the interior compartment formed by these wall sections for repairing or replacing any of the switch control assemblies, or any part thereof, mounted therein. The base or lower wall section 36 is provided with apertures 56 and 58 for a purpose to be more fully described hereinafter.

The lid 34 is pivotally mounted with respect to the cover or top wall 30 of the cabinet by means of a hinge element 60 secured to said top wall or cover 30 in any desired manner, the said hinge element having an outer substantially U-shaped end portion terminating in a rolled marginal edge portion 62 suitably threaded at both ends to receive screws 63, or the like, which extend through and are mounted in apertures 64 of the lugs 42, about which the lid pivots when raised and lowered. The outer end portion of the hinge element extends through opening 65 provided in the base 36 which permits moisture to drain from the lid when the same is raised.

The front panel 24 of the cabinet is curved transversely to pleasing lines, the same being provided adjacent the upper marginal edge thereof with an opening 66 in which is mounted a panel 68 of translucent material such as "Lucite" in or on which a trade-name or the like may be impressed or otherwise embodied therein. The trade-name or the like is made more readily readable by means of a pilot light 70 mounted in the cabinet 2 to the rear of the panel and incorporated in the control circuit shown in Figure 25 of the drawings. The front panel 24 terminates short of the side panels of the cabinet to provide a toe space 72. The inner wall defining the toe space 72 is formed or defined by the finishing strip 74 which has its outer face transversely curved on the order of the curvature of the front panel 24, and is removably secured to the base structure 4 by means of the ball studs 76. The rear panel 22 may have louvers 78 formed therein which facilitate the circulation of air within the cabinet for dissipating heat in the environment of the motor and other operating mechanisms. This back panel is also provided with openings 80 and 82 through which water supply and removal conduits extend, as will be hereinafter more fully described. The unitary cabinet structure may be removably secured in any desired manner to the base structure 4, but preferably by means of screws or the like extending through one or more of the wall panels, thus providing a suitable connection whereby the cabinet may be readily and easily removed to gain access to the interior assembly of the washing machine for repair, adjustment or replacement of any part thereof.

The cover or top wall 30 is further provided with the openings 84 and 86 through which the shafts of control devices are adapted to extend. The control devices are of somewhat similar construction in that each is provided with a shaft 88 extending up through one of the openings in the cover 30, the same being manipulated by a control knob 104, such as more particularly disclosed in Figure 15 of the drawings. The control knob disposed in association with the opening 84 controls the thermostatically operated mixing valve 90 connected to the hot and cold inlet conduits 92 and 94 extending through the opening 80 in the back panel 22 of the cabinet, the said control valve being operable to supply warm, hot, or medium warm water into the rotatable receptacle 8, as will be hereinafter more fully disclosed. The control knob associated with the opening 86 of the top or cover 30 is adapted to position the cams of a timer motor for automatically effecting a washing operation in cyclic sequence, the said knob, if desired, also embodying the line switch 96 for the main line circuit, as shown in Figure 25 of the drawings.

The control shaft 88 for the timer is threaded adjacent its upper end and is provided with a cut-out portion 98 to form a non-circular portion which extends through an opening 100 of similar shape centrally disposed in a dial 102 whereby the dial 102 is adapted to be moved in unison with the shaft 88. The threaded end of the shaft 88 which extends upwardly beyond the dial 102 is adapted to receive the knob 104 provided with an insert 106 which threadedly engages the threaded reduced end portion of the shaft 88. Disposed below the dial 102 and threadedly engaging the shaft 88 is a lock nut 108 adapted to be adjustably positioned for adjusting the position of the dial and knob with respect to the cover 30. It will be seen that upon tightening of the knob 104 on the shaft 88, the dial 102 will be positioned between the knob and the lock nut 108 whereby the dial can be rotated by the operator. This dial is provided with suitable indicia indicating the time intervals for various steps in the washing operation. In the present case the indicia is marked in accordance with the indicated time periods for the various steps in the washing operation, as shown diagrammatically in Figure 25 of the drawings. In the control device for the mixing valve 90, the insert 106 is of such a length that clearance is provided between the end thereof and the dial 102 whereby the knob 104 can be tightened down into seating relation with the dial so that the knob may be rotated in either direction. It is also to be noted that the openings 84 and 86 are defined by the up-standing flanges 110 which tend to prevent ingress of moisture, dirt and the like into the interior of the cabinet which might otherwise damage the operating and control mechanisms.

The base structure 4 is of rectangular formation and comprises the horizontally disposed L-shaped angle iron sections or portions 112, 114, 116 and 118, each of which has a horizontally and inwardly disposed leg or web 120 and a vertically and upwardly extending web or leg 122. These sections are secured together by any desired means, such as welding or the like. The base structure is further provided with corner posts or pedestals 124, 126, 128 and 130 formed from angle irons of the desired length which are rigidly secured in position, as by welding or the like, to the horizontally disposed L-shaped angle irons at the corners of the base structure, and each of which is provided with an inturned supporting flange, such as 132, adapted to provide a support for the outer tub 6. Extending between and secured to the horizontal legs 120 of the angle irons 112 and 116 is a channel shaped frame member 117 of arched formation provided with an opening 119 in its central web for supporting the inner tub 8 and its associated mechanisms, as will be hereinafter more fully described. As shown more particularly in Figure 11 of the drawings, corner brackets 134 are secured to the tub 6 and have their horizontally disposed legs in overlapping and supporting relation to the inturned flanges 132 of the posts or pedestals, the same being secured thereto by means of bolts 133, or the like for rigidly securing the tub 6 to the base structure 4.

Adjacent each corner of the base structure there is provided a short foot or adjustable leg portion 136 comprising a threaded nut secured to the base structure and an adjustable threaded shank having an enlarged head with a center point thereon facing toward and being adapted to penetrate the floor or foundation. These adjustable legs are provided to maintain all four supporting points of the machine in contact with the floor and at the same time to maintain the machine level. This tends to prevent any vibrations which may be set up in the machine from moving or displacing the machine from its operating position. Any suitable locking means may be provided to lock the same in any adjusted position after the washing machine has been leveled.

The outer tub 6 is formed with a side wall having its lower portion 138 cylindrical in horizontal cross-section and its upper portion 140 frusto-conical in shape which terminates in an inwardly extending flange 142 provided with an annular curved recess or groove adapted to receive a toroidal shaped sealing element 144 of resilient and compressible material, such as rubber or the like, which fits within the recess or groove and is compressed against the inner surface of the top wall or cover 30 in spaced relation to the opening 32 thereof to provide a fluid-tight joint therebetween and to prevent water within the tub 6 from leaking into the chamber or compartment formed between the outer tub 6 and the cabinet 2 and into the lower part of the cabinet disposed below the said outer tub 6. The outer tub 6 is further formed with a bottom wall 146 sloping inwardly and downwardly from the side wall portion 138 for the purpose of draining liquid falling into the bottom of the outer tub to the conical shaped drain outlet 148 depending from the bottom wall. This bottom wall is further formed with a centrally disposed crowned portion 150 having an opening 152 therein defined by an annular up-standing flange 154 which terminates in an outwardly extending peripheral portion 156 providing a shoulder for a purpose to be hereinafter more fully disclosed. The said tub 6 is also provided with an offset portion 158 which extends upwardly into the tub to provide clearance for the motor 160 which operates the washing machine.

The inner tub 8 disposed within the outer tub 6 is formed in two sections or parts, the outer part having an imperforate side wall 162 and an imperforate bottom wall 164 formed with a central hub 166 in which a shaft 168 is journaled. This shaft extends above the hub portion 166 and is splined, as at 170, to the agitator 10 which is mounted thereon. A sealing device, generally referred to as 172, embraces the upper end of the shaft 168 and the hub 166 and provides a fluid-tight joint between the shaft and the interior of the tub 8.

The inner part or section of the tub 8 is in the form of a perforate basket 174, the lower portion of which is disposed in substantially parallel relation to the side and bottom walls 162 and 164 of the outer imperforate part of the tub 8. The inner basket is rigidly secured to the side wall 162 by means of a plurality of screws 176 and is held in spaced relation to the outer imperforate tub by means of the spacing washers 178 to provide a channel which allows heavy dirt and the like to settle out below the basket so that when the tub 8 is rotated such heavy dirt and the like will be carried by the water passing through the perforations and flowing between the basket and the outer imperforate tub over the top of the wall 162 without passing through the clothes contained within the inner tub 8. The upper portion 180 of the basket 174 is imperforate and extends upwardly and inwardly and terminates in the rolled edge 182 defining an opening 184 disposed in association with the opening 32 whereby the operator is able to gain access to the interior of the rotatable tub 8 when the lid 34 is lifted. The upper portion 180 of the tub 8, by virtue of its inward inclination, serves to restrict the upward movement of clothes or other material contained within the tub 8 when the same is rotated during a drying operation. It should be observed in passing that the upper edge of the outer imperforate part of the tub 8 does not define the liquid level in the tub. Such level is controlled by mechanism which will be later more fully described.

The upper imperforate portion 180 of the basket has mounted thereon a hollow toroidal shaped tubular member 186 having a body of mobile material 188 of relatively high specific gravity, which assembly serves as a balancing ring for a purpose to be hereinafter more fully described. Steel wool or the like may be used to dampen the movement of a fluid when used in the balancing ring. This balancing ring 186 is secured to the upper wall portion 180 by means of a plurality of clips or brackets 190 secured to said wall portion 180 by means of bolts 192 or the like. As will be apparent, the outside diameter of the balancing ring 186 is less than the diameter of the inner tub 8 in order to position the balancing ring so as not to be engaged by wall 140 of the outer tub 6 in the event of excessive wobbling or gyratory movement of the inner tub which might otherwise cause damage thereto.

Formed as a part of the bottom wall 164 of the inner receptacle is a gear housing 194 having a cover or closure 196 provided with a downwardly extending hub or hollow supporting member 198 which embraces and is rigidly secured to the upper end of a hollow shaft 200 which extends downwardly through the opening 152 in the bottom wall 146 of the outer tub 6 and terminates in a restricted end portion 202 which provides a shoulder 204 mounted upon a radial and thrust bearing 206 which is supported by the arched supporting member 117 of the base structure 4. The radial and thrust bearing 206 comprises an inner race ring 208 which engages shoulder 204 of the hollow shaft 200 and an outer race ring 210 which is supported upon a dish-shaped member 212 substantially Z-shaped in cross-section, the lower inwardly extending annular flange 214 thereof engaging the outer race ring 210 and the upper outwardly extending annular flange 216 of which engages and is flexibly supported by the annular resilient bushing 218. The resilient bushing 218, which may be of rubber or the like, is supported by the annular dish-shaped retaining member 220 which extends downwardly through opening 119 of the channel shaped member 117. The member 220 is provided with a lower inwardly disposed annular flange 222 upon which the bushing 218 is mounted and an upper outwardly extending annular flange 224 which overlaps the central web of the channel shaped member 117 and is rigidly secured thereto in any desired manner.

Leakage between the outer hollow shaft 200 and the outer tub 6 is prevented by means of a seal or boot 226 of resilient and flexible material, such as rubber or the like, which has an enlarged lower marginal edge 228 adapted to snap over and engage the annular shoulder formed by the outwardly extending marginal portion 156 of flange 154 formed as a part of the bottom wall 164 of the tub 8. The upper end of the seal 226 is provided with an inwardly extending flange portion 230 having a friction face which bears against the lower end of the supporting hub 198, the said flange being provided with a facing of nylon fabric or the like which is impregnated with graphite or other similar material to reduce friction and wear therebetween. This construction is provided for the reason that the seal 226 remains stationary while the supporting hub 198 rotates together with the tub 8 during a spinning operation. Adequate pressure is applied to maintain this sealing relation between the seal 226 and the supporting hub 198 by means of a coil spring 232 having its upper end abutting the inwardly extending flange 230 and its lower end abutting a damper assembly 234.

Disposed within the hollow shaft 200 is an inner drive shaft 236 journaled in the outer shaft through an upper bearing 238 and a lower bearing 240 which align the inner shaft with respect to the hollow shaft and permit the inner shaft to rotate relative thereto. Splined to the upper end of the inner shaft 236 is a drive pinion 242 which is fixed thereon by means of the spring retaining ring 244, the said pinion 242 being supported upon the washer 246 which is mounted upon the bearing 238 and the outer shaft 200, whereby the drive shaft 236 is mounted in operative association with and is supported by the outer shaft 200. The pinion 242 meshes with the gear 248 rotatably mounted on the stud shaft 250 fixed in the cover 196, the said gear 248 having a pinion gear 252 integrally formed therewith which meshes with the gear 254 rotatably mounted on the stud shaft 256 fixed in the cover 196. Formed integrally with and disposed on the upper face of gear 254 is an eccentric 258 rotatably connected to a pitman 260 at one end which in turn has its other end rotatably connected to the hub 262 of segmental gear 264 pivoted for oscillating movement about stud shaft 266 which is fixed to the cover 196. The segmental gear 264 meshes with the pinion 268 mounted upon the lower end of the shaft 168.

It will, therefore, be quite apparent from the above description that when the drive shaft 236 is rotated, the shaft 168 and the agitator 10 connected thereto will be oscillated in a to-and-fro direction within the tub 8 through the driving mechanism disposed within the housing 194.

The agitator 10, as hereinbefore described, has its central hub 270 splined to the upper end of shaft 168. The agitator is further formed with a center post 272 and a base or body portion 274 extending downwardly and outwardly from the center post. One or more blades 276 which extend upwardly and outwardly from the base portion 274 may be provided which, when the agitator is oscillated, effect a washing operation within the inner tub 8. The central post or pedestal 272 extends upwardly from the base 274 and is formed with an inner chamber or compartment 278 which communicates with the interior of the tub 8 through one or more openings 280. As shown in the illustrated embodiment of the invention in Figure 1 of the drawings, a float 282 is slidably mounted within the chamber 278 and is adapted to be moved in accordance with the liquid level within the inner tub 8 for operating certain control mechanisms as will be hereinafter more fully described. The float 282 is provided with a lower open end and has its upper end closed by the end wall 284, although other modifications are contemplated by the present invention, as disclosed in Figures 16 to 21, inclusive, which will be hereinafter described in detail. As shown in Figure 26 of the drawings, the center post 272 is provided with a plurality of longitudinally and inwardly extending ribs 285 adapted to position the float 282 and to facilitate relative sliding movement of the float with respect to the center post 272.

The drive shaft 236 is rotated for oscillating the agitator 10 and for rotating the inner tub 8, as will be presently described, by means of the motor 160 mounted in the motor frame 288 which is pivoted, as at 290, to the support bracket 292 secured to the post 128. The motor 160 is provided with a pulley 294 having a V-shaped groove for driving the belt 296 which passes around and is received within the V-shaped groove 298 of the driven pulley 300. The back side of the belt 296 engages and drives the pulley 302 of a centrifugal pump 304 supported by the brackets 306 and 308 on the base structure 4, this pump being provided where the machine is to be used in a location where no floor drain is available. Where this pump is installed, the same communicates with the drain 148 and the outer tub 6 through the conduit 310 on its intake side, the discharge for the pump being through the conduit 312 extending through opening 82 of the cabinet 2 which is of sufficient length to discharge liquid pumped from the outer tub 6 to any desired place of disposal. In order to provide adequate driving tension on the belt 296 a coil spring 314 is provided and has one end connected to the motor frame 288 and the other end connected to the bracket 306.

In the washing machine of the present invention where provision is made for spinning or rotating the inner tub for extracting washing liquid from the material contained therein, the starting torque required of the motor is much greater than the torque which is required at operating speeds. From an economical standpoint a motor of relatively low rated capacity is desirable and one which will bring the inner tub up to operating speeds within a reasonable length of time. Inasmuch as the delivered torque of such a motor is less than the starting torque for rotating the inner tub 8, it is desirable to provide a clutch mechanism adapted to slip during the time when the motor is bringing the inner tub 8 up to operating speed, but in which no slipping is required after the operating speed of the inner tub 8 is reached.

The clutch mechanism which operates to transmit a constant torque between the motor and the inner shaft 236 forms the subject matter of co-pending applications filed in the name of Thomas R. Smith, now Patents No. 2,604,764 and No. 2,604,765, issued July 29, 1952. The pulley 300 is provided with a hub 316 having a bearing or bushing 318 mounted therein which is rotatably mounted on a hub 324 of the driven member 322. This pulley is formed with the downwardly extending and integral cylindrical wall 320 provided with an inner face forming a friction driving surface for the slip clutch. The driven member of the clutch is constituted by a clutch drum 322 having the hub 324 thereof splined, as at 326, to the lower end of shaft 236, the drum being held in operative position on the shaft 236 by the spring retaining ring 328. As will be noted, the clutch drum 322 has a washer 329 embracing the central hub 324 thereof upon which the hub 316 and its bushing 318 are mounted for positioning the pulley 300 with respect to the driven member. The clutch drum 322 is provided with an integrally formed upstanding wall 330 disposed inwardly of and in spaced relation to the cylindrical wall 320 of the pulley 300, the said wall having an opening 332 provided therein. Disposed between the cylindrical walls 320 and 330 and supported upon the annular flange 334 of the drum is disposed a clutch band 336 to which is secured a clutch band lining 338 adapted to frictionally engage the inner surface of the cylindrical wall 320. Mounted upon the clutch drum 322 is a curved control spring 340 provided with radially extending ends 342 and 344 which extend through the opening 332 and are connected to the ends of the clutch band 336. As will be apparent, the spring 340 acts to expand the clutch band 336 whereby the clutch band lining 338 is moved into driving relation with the inner surface of the wall 320. All of the driving torque from the pulley 300 is transmitted by friction through the clutch band lining to the clutch band 336 and then to the clutch drum 322 through the spring 340 which has its ends 342 and 344 connected thereto.

As the pulley 300 is rotated, the friction between the inner face of the wall 320 and the clutch band lining 338 causes the clutch band 336 which carries the control spring 340 to rotate a short distance until one end of the control spring contacts one edge of the wall 330 defining the opening 332, the edge of the wall 330 engaged by the control spring depending, of course, upon the direction of rotation of the pulley 300. The clutch drum 322 is then caused to rotate and drives the shaft 236. When the torque required to rotate the shaft 236 exceeds the loading of the spring 340 slippage occurs between the pulley 300 and the clutch drum 322. This slippage occurs until such time as the torque required to rotate the shaft 236 is equal to or less than the torque being transmitted between the pulley 300 and the clutch drum 322 through the lining 338. This clutch construction provides for the delivery of constant torque to the shaft 236 which cannot be exceeded, whereby the shaft 236 can be brought gradually up to speed for the spinning operation without causing damage to the motor 160 because of excessive loads during the starting period. After the inner tub 8 has been brought up to speed, the torque required to maintain this speed is less than the rated capacity of the motor and, accordingly, no slippage takes place between the pulley 300 and the clutch drum 322.

As will be apparent from the above description, the combined radial and thrust bearing 206 mounted on the reduced portion 202 of the outer shaft 200 and engaging the annular shoulder 204 thereof not only supports the receptacle 8 and associated mechanisms but also provides a support for the inner shaft 236 through the thrust bearing 246 and, accordingly, such radial and thrust bearing positions and supports the pulley 300 and the constant torque slip clutch immediately above described which effects a driving connection between said pulley 300 and the shaft 236. It is to be noted that as the receptacle 8 is moved laterally, as it will under certain conditions of operation presently to be described, the same will tilt about the bearing 206 and that the said bearing constitutes the sole support for the receptacle and the agitating mechanism as well as other mechanisms to be hereinafter more fully described. Furthermore, the pulley 300 is dish-shaped so that the center line of the groove 298 passes through the pivot point of the bearing 206 in order to minimize deflection of the driving belt 296 at all times.

As previously referred to in a general way, the present invention contemplates a structure in which material within the receptacle 8 is subjected to a washing operation through the action of the agitator 10 and also subjected to a centrifuging action whereby the said material is spin dried upon rotation of the tub 8. In order to rapidly rotate the inner tub 8 suitable clutch mechanism is provided for effecting a driving relation between the inner shaft 236 and the outer shaft 200. In the illustrative embodiment of the invention such clutch mechanism takes the form of a spring clutch including an expanding type tapered spring clutch element 346 embracing the shaft 236 and being disposed within the enlarged hollow portion 348 of the outer hollow shaft 200. The lower end of the spring clutch element 346 is connected to the shaft 236 whereby a driving connection between the shaft 236 and the spring clutch element 346 is effected and a pin 350 prevents relative displacement of the two elements. The upper actuating end of the spring clutch element is arranged to be engaged by a key 352 mounted within the clutch collar 354. During the period when the agitator 10 is being operated, the clutch collar 354 is held in an elevated position by means of bell crank lever 356 whereby the key 352 is disengaged from the upper operating end of the spring clutch element 346. When the bell crank lever 356 is tripped, the clutch collar 354 moves downwardly under the action of gravity to position the key 352 in the path of movement of the upper operating end of spring clutch element 346 whereby the said spring clutch element is expanded to frictionally engage the wall of enlarged recess 348 of the outer hollow shaft 200 at which time a driving connection is effected between the shafts 200 and 236 to rapidly rotate the inner tub 8.

The bell crank lever 356 is pivoted, as at 358, to a bracket 360 connected by means of rivets 362, or the like, to a hollow sleeve 370 constituting a part of the damper mechanism 234 to which is secured a brake shoe support 364 forming an element of brake mechanism 365, to be hereinafter more fully described.

Figure 4:
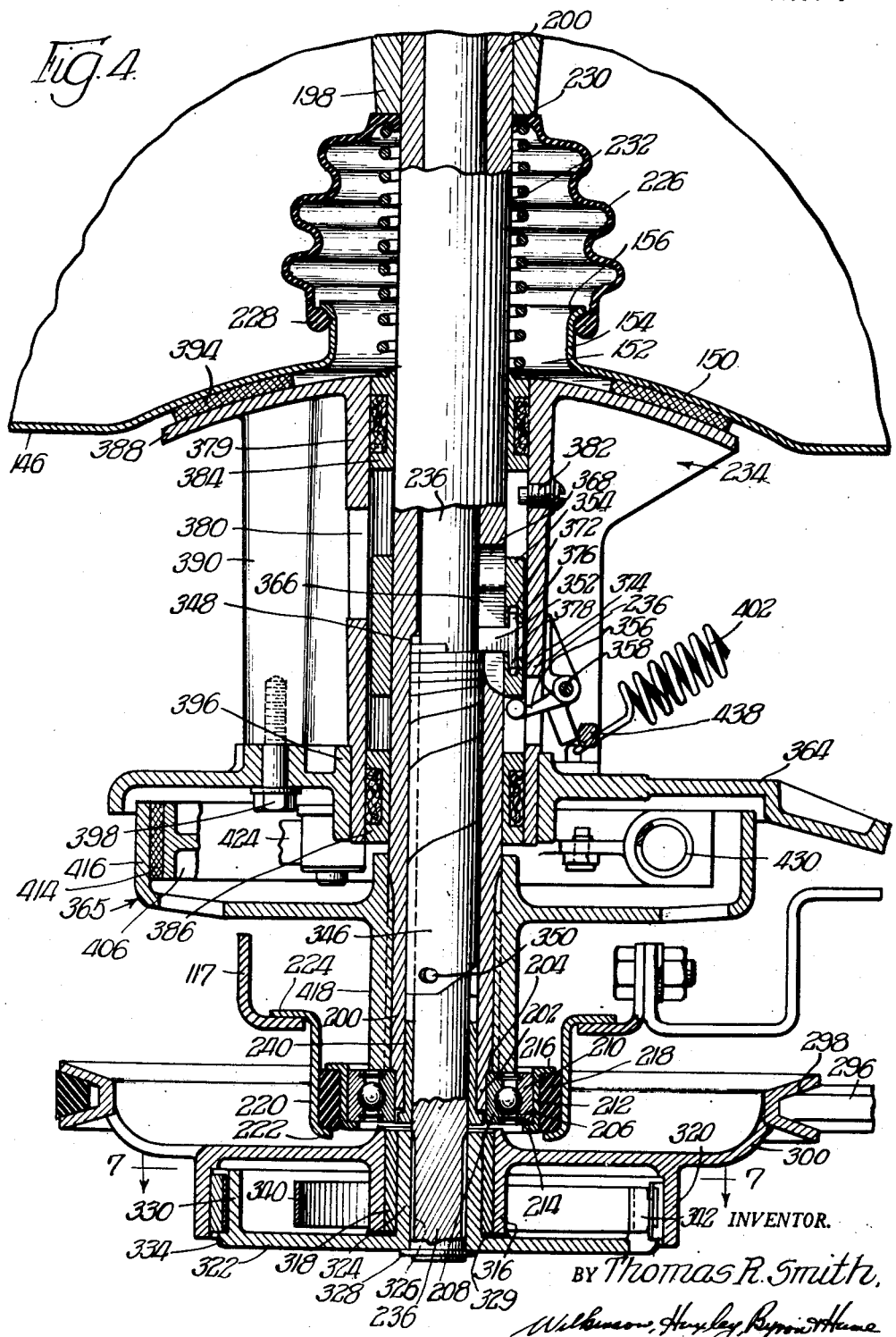
Figure 4 is an enlarged fragmentary vertical cross-sectional view of the driving mechanism of the washing machine.

The clutch mechanism requires a minimum of space in the device and the assembly for the clutch operating means is such as to permit the same to be rapidly and easily assembled and disassembled. As disclosed more particularly in Figures 4, 8 and 9 of the drawings, the key 352 is of T-formation and has its operating shank or extension movably mounted within the keyhole slot 366, the said key being restrained from turning movement within the lower part of the slot 366, but the opening 368 at the upper portion of the slot is of such size as to permit the key 352 to be turned at 90° to its normal operating position. The clutch collar 354 is provided with an opening 370 having a lateral dimension adapted to permit radial movement of the extensions 376 and 378 of the key 352 with respect to the collar 354 when the shank or extension thereof is disposed within the opening 368 at 90° to its normal operative position. The opening 370 is defined at its upper and lower edges by the under-cut grooves 372 and 374 which are adapted to receive the extensions 376 and 378, respectively, of the key to prevent lateral radial movement of the key 352 with respect to the shaft 200. It is therefore apparent that when the opening 370 is aligned with the opening 368 the key 352 may be disposed at 90° from its normal operative position and either removed from or inserted into its engaging relation with the clutch collar 354. As will be noted, the damper mechanism 234 is provided with a hollow sleeve 379 which surrounds and embraces the outer shaft 200 and has the upper and lower journal bearings 384 and 386 mounted co-axially with and journaled on the hollow shaft 200 and providing an annular space therebetween within which the collar 354 is axially movable. This hollow sleeve 379 is provided with an opening 380 which may be aligned with the openings 386 and 370 whereby the key 352 may be readily inserted into or removed from its assembled position with respect to the collar 354. Threadedly mounted in the hollow sleeve 379 is a screw 382 projecting inwardly into the path of movement of the clutch collar 354 to prevent upward movement thereof to such an extent that the shank of the key 352 enters the opening 368, but which is withdrawn sufficiently to permit the collar 354 to be moved upwardly a sufficient amount to bring the openings 368, 370 and 380 into alignment when it is desired to insert or remove the key 352. As shown in Figure 4 of the drawings, the upper journal bearing 384 provides a shoulder against which the lower end of the coil spring 232 for the seal 226 abuts.

The hollow sleeve 379 is formed with an outwardly extending spherical shaped wall 388, reinforced by the oppositely disposed webs 390, and to the upper surface of which friction material 394 is connected in any suitable manner which frictionally engages or mates with a complementary spherical surface formed on the under side of the central crowned portion 150 of the outer tub 6.

The brake shoe support 364, heretofore referred to generally, is formed with a hub 396 mounted on the lower end of the hollow sleeve 379 the said support being connected by a plurality of bolts 398 in fixed relation to said hollow sleeve. The webs 390, of which four are shown in the present embodiment are each provided at their lower end with an aperture 400 engaged by the end of a coil spring 402. Each of these springs extends at an angle to the vertical axis of the sleeve 379 and has its opposite end mounted in a bracket 404 rigidly secured to the bottom wall 146 of the outer tub 6. Due to the angular disposition of the springs 402 with respect to the vertical axis of the sleeve 379 and their connection to the brake shoe support 364 and the tub 6, a component of the spring force is applied in a vertical direction to the friction material 394. It is also apparent that inasmuch as the springs 402 are equally loaded and the springs of each pair are disposed in opposite relation to one another, the spring forces acting through the hollow sleeve 379 will tend to return the tub 8 to its neutral or vertical position where the spring forces are all equal or opposite should said tub 8 tend to move away from its normal vertical position. It is further apparent that the friction material 394 is forced by the springs into effective frictional engagement with the spherical under-surface of the bottom wall 146 of the outer tub and that as the receptacle tends to move in a horizontal plane a certain portion of the energy tending to move the receptacle is absorbed by the friction material. The friction material, therefore, tends to reduce the amplitude or extent of horizontal movement of the inner tub and absorbs some of the energy applied thereto when the said tub wobbles or moves laterally under eccentric loadings within the tub during a spinning operation.

When the shaft 236 is rotated freely to oscillate the agitator 10, at which time the key 352 is disengaged from the spring clutch element 346, the outer shaft 200 and the tub assembly connected thereto is held against rotation by the friction brake 365. As previously indicated, this friction brake mechanism incorporates the brake shoe support 364 having the brake shoes 406 and 408 pivoted thereto as at 410 and 412, respectively, the said brake shoes being provided with a brake lining, such as 414, engageable with the inner cylindrical surface of the brake drum 416 having a hub 418 splined to the outer hollow shaft 200 and which has its lower end in abutting relation with the inner race ring 208 whereby the same is supported and held in operative position. The brake shoes 406 and 408 at their opposite ends are pivotally connected, respectively, through the links 420 and 422 to the crank collar 424 secured to the lower end of a pin 426 mounted in the brake shoe support 364. An operating arm 428 is connected to the upper end of the pin 426 whereby the brake shoes, which are normally in engagement with the brake drum 416, may be moved inwardly and out of such engagement when the outer shaft 200 is driven by the inner shaft 236 through the spring clutch element 346. A coil spring 430 is interposed between the brake shoes 406 and 408 which normally maintains said brake shoes in frictional engagement with the brake shoe drum 416. The outer end of the operating arm 428 is connected through a link 432 to a solenoid 434 connected in the control circuit for operating the brake during a washing cycle. The solenoid 434 is normally deenergized while the agitator 10 is operated during which time the spring 430 maintains the brake shoes 406 and 408 in frictional engagement with the brake shoe drum to maintain the outer sleeve 200 and the tub 8 and its associated mechanisms stationary. Mounted on the brake shoe support 364 is a stop element 436 for limiting the outward movement of arm 428. The arm 428 is provided with a projection 438 engageable with one leg of the bell crank lever 356 for moving the bell crank lever about its pivot point 358 to maintain the clutch collar 354 in a position whereby the key 352 is disengaged from the operating end of the spring clutch element 346. In order to hold the bell crank lever 356 in a position to render the spring clutch mechanism inoperative, the arm 428 has a coil spring 440 connected thereto which is anchored at its other end in the base structure 4. Upon energization of the solenoid 434, the arm 428 is moved thereby in a clockwise direction, as viewed in Figure 2 of the drawings, to move the projection 438 thereof out of engagement with the bell crank lever 356 thus permitting the bell crank lever 356 to swing about its pivot point and to allow the clutch collar 354 to move downwardly with respect to the shaft 200 whereby the key 352 engages the spring clutch element 346 to effect a driving connection between shafts 236 and 200.

The brake mechanism 365 is held against torsional movement when the brake is applied by two stabilizing assemblies. As shown more particularly in Figure 2 of the drawings, the brake shoe support 364 has the oppositely extending arms 442 and 444, the latter of which provides a support for the solenoid 434. As shown more particularly in Figure 12 of the drawings, each of the arms 442 and 444 is provided adjacent its outer end with a hub in which is mounted a resilient bushing 446 adapted to receive one end of a stabilizer link 448 which is secured in position by means of the cotter pins 449, or the like. The other end of the link is similarly mounted in and secured to a resilient bushing 450 mounted in a bracket 452 connected to the base structure 4. These stabilizer links extend in opposite directions from the arms 442 and 444, thus providing a resilient and flexible connection which prevents torsional movement of the brake mechanism 365 when the brake is applied but which at the same time allows freedom of oscillation of the shafts 200 and 236 and associated mechanisms.

As will be apparent, the entire spinning structure and associated mechanisms are entirely supported on the resilient bushing 218 and that when the inner tub 8 and its associated mechanisms are rotated during a spinning operation the assembly will tend to wobble due to unbalanced loads, with the greatest off-center movement being at the top of the inner tub inasmuch as the bottom point of support at the bearing 206 is held fixed in place and is only free to tilt in the bushing 218. As the spinning structure is brought up to speed, it will pass through a critical period of oscillation determined by the weight of the spinning structure, including the water and the material within the inner tub 8, and the resiliency of the springs 402. These springs 402 are for the purpose of keeping the spinning structure centered. When the spinning structure passes through its critical speed of rotation there will be a tendency for the amplitude of the wobble of gyratory movement of the spinning structure to increase and this will be dampened out by the damper mechanism 234. In addition to the centering effected by the springs 402 and the action of the damper mechanism 234, the balancing ring 186 which is mounted adjacent the top of the tub further assists in preventing too great a shift in the center of gravity of the spinning structure. The balancing ring does not become effective upon acceleration until after the critical speed has been passed, but upon deceleration it is effective through the critical speed of rotation of the spinning structure. Above the critical speed the spinning structure tends to rotate about a new center of gravity different from the geometrical center of the tub 8, depending upon the character of the unbalanced load in the inner tub 8. This shift in the center of rotation is toward the center of mass of the unbalanced load which causes the fluid in the balancing ring to move in the opposite direction thereby tending to compensate for this unbalanced load condition.

In addition, the illustrative embodiment of the present invention contemplates the provision of driving means for the agitator 10 which is located within the gear casing 194 associated with and forming a part of the bottom wall 164 of the inner tub thus providing an additional mass extending laterally of the normal vertical axis of the spinning structure and being spaced a suitable distance about the support point therefor so that such mass is exceedingly effective in correcting any tendency of the inner tub 8 and its contents to wobble or move laterally from its normal vertical position. In order to counterbalance the eccentric position of the driving means for the agitator 10, a counter-weight 195 is connected to the tub 8 in opposed relation to said driving means disposed within the gear casing 194.

Washing fluid is delivered from the thermostatically controlled mixing valve 90 to a conduit 454 which extends upwardly within the chamber between the cabinet 2 and the outer tub 6 and is connected at its upper end in any desired manner to an injector tube 456. The injector tube is formed as an integral part of a U-shaped bracket 458 which is secured to the outside of the outer tub 6 on opposite sides of an opening 460 provided therein. Secured to the inside of the outer tub 6 in communicating relation to the opening 460 is an inlet spout 462 which extends inwardly from the outer tub 6 in overhanging relation to the inner tub 8 and terminates in a discharge opening adapted to introduce washing fluid into said inner tub 8. A screen 464 is secured within the inlet spout adjacent its discharge end for breaking up the stream of washing liquid to produce a soft, non-splashing flow thereof into the inner tub 8. As will be seen the screen 464 is of rectangular shape in cross-section thus providing two spaced foraminous barriers perpendicular to the direction of flow of liquid into the inner tub 8.

The injector tube 456 is spaced from the inlet spout 462 by an air gap which is capable of interrupting the flow of washing liquid into the inner tub 8 should a drop in pressure occur in the line, thus preventing any possibility of a return of dirt or contaminated water into the supply system. In order to prevent water from falling into the operating mechanism at the bottom of the casing 2, a drip basin 457 is connected to the tub 6 below the injector tube 456, the same having an outlet passage 459 formed in the tub 6 whereby any water falling downwardly from the injector tube 456 is conducted into said tub.

As previously described, the float 282 is operated in accordance with the liquid level within the inner tub 8 for operating control mechanism, generally referred to as 14, which has certain control elements mounted within the lid 34 of the washing device. While the specific illustration of the invention contemplates the mounting of this float within the recess provided in the center post for the agitator, nevertheless, the invention comprehends the mounting of such a float within a center post or supporting structure irrespective of whether or not the same is in any way associated with the agitator or other washing means disposed within the tub 8. The float 282, according to the disclosure in Figure 1 and Figures 22 to 24, inclusive, is adapted, upon the washing liquid attaining a predetermined height in the receptacle 8, of moving a control button 466 which extends through opening 56 in the base section 36 of the lid into the path of movement of the float 282. This control button is secured adjacent one end of a lever arm 468 which is pivoted at its other end, as at 470, in a bracket 480 secured, as at 482, to the base section 36. A bracket 475 is pivotally mounted, as at 476 and 478 on the bracket 480 and provides a support for two control switches 472 and 474 of the mercury type, the said bracket 475 being moved about its pivot points 476 and 478 by the lever 468 which is adapted to engage the same when moved by the float 282. The mercury switches 472 and 474 are mounted in the bracket 475 with their longitudinal axes angularly disposed with respect to one another for a purpose to be hereinafter more fully described, and have their contacts 484 and 486 oppositely disposed, as more clearly shown in Figure 25 of the drawings. As shown in Figure 22 of the drawings, the button 466 is in its lowermost position, indicating that the inner tub 8 is empty or that the liquid level in the tub is ineffective to raise the button 466. Under such circumstances the contacts 484 of switch 472 are bridged by the mercury contained in the switch, whereas the contacts 486 are not bridged by the mercury in switch 474, which is at that time disposed at the lower end of the switch. However, upon introduction of a washing liquid into the tub 8 to a predetermined level the button 466 is engaged by the float 282 and is raised into engagement with the switch bracket 475, causing the said bracket to pivot about the pivot points 476 and 478 into the position as shown in Figure 24 of the drawings, whereby the switch 472 is rendered inoperative and switch 474 has its contacts 486 bridged by the mercury contained therein. The results accomplished by angularly disposing the switches 472 and 474 with respect to each other and the operation of the switches in the control circuit, as shown in Figure 25, will be more fully described hereinafter.

Mounted for pivotal movement about the pin 470 and extending downwardly through the opening 58 in the base section for the lid and in opposite relation to the center post 272 is a safety shut-off lever 488 having a latch 489 provided with an inturned upper end portion 490. Mounted for pivotal movement, as at 492 and 494 on the bracket 480, is a bracket 496 on which is mounted a safety shut-off switch 498 of the mercury type held in operative position by means of the inturned end 490 of the latch 489 which engages the shoulder 500 of the bracket 496. The switch 498, as will be hereinafter more fully described, is included in the main line circuit and when moved to inoperative position, renders the entire electric circuit inoperative to stop the washing machine. The inter-engagement of the inturned end 490 and shoulder 500 is normally maintained by a coil spring 502 connected at one end to the latch 489 and at its other end to the post 504 extending upwardly from the base section of the lid.

The lever 488 extends downwardly below the base section 36 for the lid in opposite and spaced relation to the center post 272 for the agitator so that when the center post assembly, during the spinning or rotation of the inner tub 8, wobbles or gyrates to move the tub 8 an excessive distance laterally from its normal vertical position due to an unbalanced load condition within the container 8, the center post 272 engages the lever 488 to move the latch 489 against the action of spring 502 which releases the bracket 496 for downward movement by gravity about the pivot points 492 and 494 which renders the switch inoperative, thus breaking the main electric circuit and stopping the entire machine. The switch 498 also has its contacts disposed adjacent the pivot points 492 and 494 so that the switch is inoperative when the lid is raised, thus deenergizing the entire circuit and making it impossible for the operator to operate the washing machine until the lid is again closed. This arrangement provides a safety device which eliminates any possibilities of injuring the operator during the washing cycle, particularly when the inner tub 8 is rotated at a high rate of speed. The switch 498 is pivoted in such a manner that when the lid is raised, the bracket 496 will automatically swing back into a reset position whereby the inturned end 490 engages shoulder 500 of the bracket so that when the lid is closed the mercury for the switch 498 bridges the contacts thereof and the switch is again in position to act as a safety unbalance shut-off switch should gyratory movements of the inner tub become excessive due to unbalanced loadings. In the event that the latch 489 is tripped due to such unbalanced loading, all the operator has to do is to open the lid to reset the safety switch and to again close the lid, after which the machine continues to operate in its normal cycle of operation.

With particular reference to the float control hereinabove described, it may be pointed out that in the past, in automatic washing machine constructions of the vertical axis type provided with an inner tub for washing and centrifuging and an outer tub for receiving the washing liquid, certain types of controls have been used for determining the wash water level in the inner tub, one of which comprises the use of a constant flow orifice and using a timer device to control the length of time the water flows in order to meter a certain amount of water into the tub. Another procedure is to provide a float control in the outer tub which necessitates the use of a recirculation pump, the water level in the inner tub being determined by said float control in the washing cycle. According to the first method, there are many disadvantages in that differences in water pressure lead to inaccurate measurement of the amount of water introduced into the washing tub and, under certain conditions, it is possible for the washing cycle to proceed without any liquid whatsoever in the tub. The second method likewise has similar disadvantages. Such an assembly requires recirculating pump valves and connections which must be serviced and maintained in operative condition. Furthermore, the float is inaccessibly located in the outer tub which cannot be easily and readily serviced to remove lint and dirt which necessarily collects thereon.

The present invention is particularly adapted to the vertical axis type of automatic washing machine which has the inner tub supported for rotation substantially about its vertical axis. In accordance with the present invention, it is not necessary that a vertically disposed agitator be used in the washing machine as long as it is possible to have a center supporting structure which can carry the float either on the inside of the structure or on the outside of the structure and so that the float can be used for operating a control mechanism which is conveniently located in the center of the lid. The control mechanism in the lid may be mechanical or electrical for regulating the flow of liquid into the tub and/or controlling one or more operations in the automatic washing cycle.

As will be apparent, the provision of a float carried by a center post structure has the advantage that the same can be readily removed for cleaning. Where the float is placed within the center post the same is not disturbed by circulation or movement of the clothes or washing liquid within the tub although, as will be apparent, it is always essential that the center post be properly vented to the interior of the tub so that the float will actually register the water level within the said tub.

It will also be apparent that the wobbling or gyratory movement of the rotating tub or the reciprocation of the agitator will not interfere with the proper operation of the float. When the tub is being rotated, the water will be rapidly thrown out over the upper edge of the side wall 162 of the inner tub 8 and out of the float chamber 278 whereby the float will become inactive. Under such circumstances the float does not contact the actuator disposed in the center of the lid so that the oscillation and a high speed of spin normally will not cause any rubbing or friction on said actuator.

Figure 16:
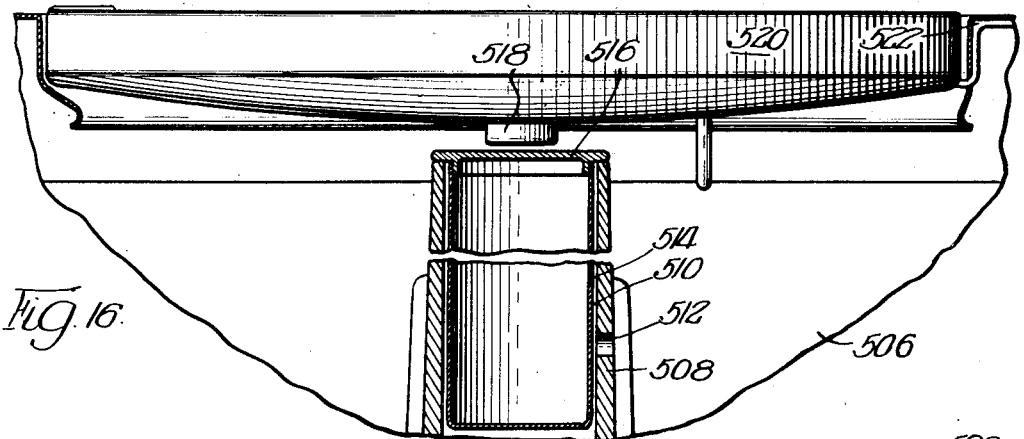

Modifications of the float assembly are contemplated by the present invention, certain of such modifications being disclosed in Figures 16 to 21, inclusive. In Figure 16, the inner receptacle 506 is provided with an agitator having a center post 508 formed with a central chamber or recess 510 communicating, through one or more openings 512, with the interior of the receptacle 506. Mounted within the recess 510 is the float 514, its open end being closed by the cap 516 overlapping the upper end of the center post 508 whereby the float may be readily grasped by the operator and removed for cleaning the same, as well as the center post, when desired. This float is adapted to operate the control button 518 mounted in the lid 520 which is hinged to a cabinet or casing 522 much on the order of the structure hereinbefore described.

Figure 17:
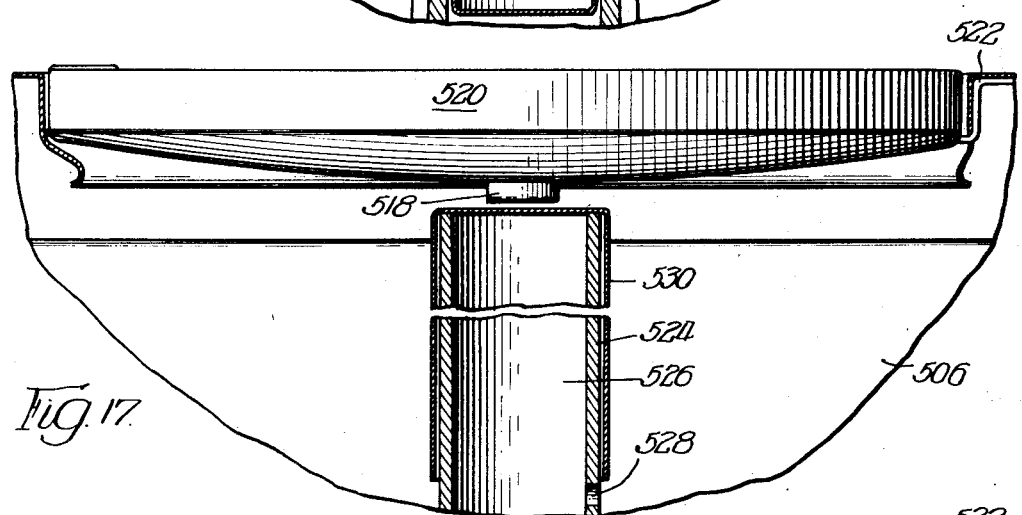

Figure 17 discloses a washing machine conforming substantially to that shown in Figure 16 except for slight modifications in structure of the center post 524 which is provided with an interior chamber 526 communicating, through one or more openings 528, with the interior of the tub 506. The float 530 of this modification is built on the order of the float shown in Figure 1 of the drawings except that the same embraces the center post 524 instead of being mounted within the chamber or recess as in the modification shown in Figure 1 of the drawings.

Figure 18:
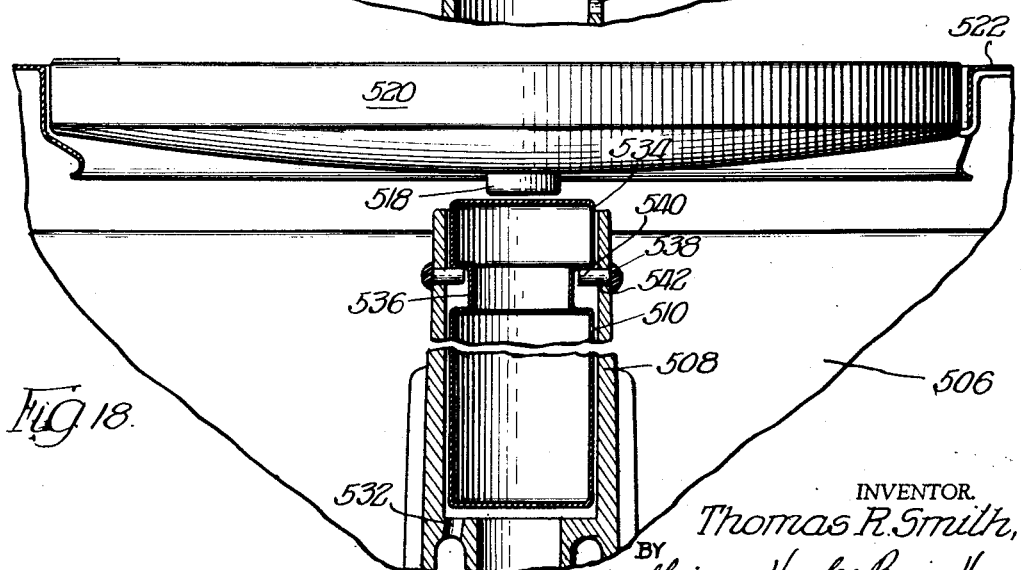

In Figure 18, there is disclosed a washing machine conforming substantially to that shown in Figure 16 wherein the center post 508 is provided with the inner chamber 510 communicating, however, with the interior of the tub 506 through one or more openings 532 provided in the lower wall defining the chamber 510 instead of in the side wall of the center post. In this modification, the float 534 has its ends closed and is formed with an annular recess 536 providing oppositely disposed shoulders for limiting the axial movement of the float with respect to the center post 508. The limiting means is constituted by a flexible band of material 538, such as rubber or the like, which embraces the center post 508 and has a plurality of spaced projections 540 extending through openings 542 in the center post. These projections extend into the annular recess 536 and are adapted to engage the end walls thereof for limiting movement of the float with respect to the center post.

In Figure 19 there is disclosed still another modification of the invention, the same comprising the inner rotatable receptacle 544 which is provided with an upstanding centrally disposed post 546 upon which is mounted an agitator 548. The agitator is operated by means of a shaft 550 mounted in the lower wall of the tub 544 and has a gear 552 mounted on the upper end thereof which extends through an opening 554 in the center post 546 and engages an internal gear 556 mounted in or formed integrally with the agitator 548, whereby the agitator may be oscillated for effecting a washing operation in the tub 544. The center post 546 is formed with an inwardly extending annular shaped flange 558 which provides a seat for the float 560 and permits washing fluid from the interior of the tub 544 to act upon the float 560 for moving the same to operate an actuating device 562 mounted in the lid 564 of the washing device. Means operated by said actuating device 562 is electrically connected in a circuit 565 of an electrically operated valve 568 for controlling flow of liquid into the tub 544 through an intake 566.

Figure 20 discloses a further modification of the invention, the same comprising a hollow center post 570 extending upwardly within a rotatable tub 571 and being apertured as in the previously described embodiments. Mounted within the center post 570 is a float 572 which is adapted to engage one end of a lever 574 pivoted, as at 576, to the cabinet or casing for the washing machine. The other end of the lever has an operating element 578 for operating a switch 580 whereby the one or more steps in the washing cycle may be controlled.

Figure 21 of the drawings discloses still another modified structure for the washing machine, the same comprising a rotatable tub 582 in which is disposed an agitator 584 operated by means of a shaft 586 for effecting a washing operation within the tub. The washing machine of this embodiment is provided with a cabinet or casing 587 having an opening 588 whereby the operator is able to gain access to the interior of the tub 582. The opening 588 is normally closed by a lid 590 having control mechanism mounted therein which includes an operating member 592 extending downwardly therefrom through an opening therein much on the order of that shown in Figure 1 of the drawings. The lid 590 has a downwardly extending hollow member 594, the interior of which communicates with the interior of the tank through an opening 596 provided in the bottom wall thereof. The member 594 is secured to the lid 590 so as to enclose the operating member 592 and has a float 598 mounted therein for operation of said control member 592. This float 598 is moved in accordance with the liquid level in the tub 582 to operate the control mechanism through the control member 592.

In those instances where the float chamber is provided in the agitator, it was found that more satisfactory performance was obtained when a single passage is provided from the interior of the tub into the float chamber. This effectively retards the transfer of fluid fluctuation from the tub into the float chamber and thereby stabilizes the float.

In order to automatically operate the machine hereinabove described, there is provided a control means including a timer motor capable of rotating a plurality of cams for actuating switch means in a predetermined sequence to cause the apparatus to perform its various functions. A control circuit for causing the washing machine to operate automatically is disclosed in Figure 25 of the drawing, the same including a switch 96 which may be mounted in the control device for the circuit and which controls the main circuit L¹ and L². The main circuit includes a timer motor 600, the main driving motor 160, the mixing valve 90, the brake solenoid 434, the float switches 472 and 474, the unbalance switch 498 and the pilot light 70. The pilot light 70 is directly connected across the lines L¹ and L² and is lighted when the line switch 96 is closed except when the unbalance switch 498 is rendered inoperative either because of the lid 34 being in open position or because of the disengagement of latch 489 from the shoulder 500 as a result of excessive unbalanced or eccentric loads in the receptacle 8 which has caused the center post 272 to engage the lever 488. As will be noted, the unbalance switch 498 is incorporated in the main line L¹. The remaining pieces of control mechanism are connected directly to one side of the line through contacts operated by a plurality of cams 602, 604, 606 and 608 which are driven in one direction only by the timer motor 600.

The sequence of operation includes a period during which liquid is introduced into tub 8, a washing period, a spin period during which a flush rinse is applied for a short interval of time to remove soapy water from the clothing and tub, an agitate rinse period, a spin period for spin drying the clothes or material within the tub 8 and a reset or inactive period. As previously described, switches 472, 474 and 498 are disposed within the lid 34. When the tub 8 is empty and the lid 34 is closed, the switch 472 is in its closed position whereas the switch 474 is in its open position. The unbalance switch 498 is also in its closed position. At this time the brake solenoid 434 is deenergized and the brake shoes 406 and 408 are urged into frictional engagement with the drum 416 by the spring 430 whereby the outer shaft 200 and the tub 8 are held stationary. When the line switch 96 is closed and the knob 104 of the control device is moved to initiate a washing cycle, a circuit is completed whereby water from the mixing valve 90 is introduced through the conduit 454 and nozzle 462 into the tub 8. The mixing valve 90 is constructed to introduce either warm, hot or medium hot water into the receptacle 8. The control circuit, however, is arranged so that for the washing period only a selection may be made by the operator as to whether warm, hot or medium hot water is to be introduced into the tub 8. The circuits for the introduction of these wash waters can be traced through main line L¹, conductor 610, contacts 484 of switch 472, conductor 612, to one of the contacts 609 of cam 608 (this being common to both cams 606 and 608), the other contact of cam 608 being connected through the conductor 614 to the movable contacts 616 and 618 of the switch for the mixing valve 90. When it is desired to introduce medium hot water into the tub 8 the control knob 104 is moved to position the contacts 616 and 618 in engagement with the contacts 620 and 622, respectively, as shown in Figure 25 of the drawings. Accordingly, the circuit for the introduction of medium hot water into tank 8 is completed through the solenoids 624 and 626 of the warm and hot water valves, respectively, and thence through the conductor 628 to the main line L². In the event that it is desired to introduce hot water into the tub 8, the control knob 104 for the mixing valve 90 is moved to its "hot" position at which time to circuit from cam 608 is completed through the conductor 614, contacts 618 and 630, solenoid 626 of the hot water valve, and thence through conduit 628 to the main line L². In the event that it is desired to introduce warm water into the tub, the control knob 104 for the mixing valve 90 is moved to its "warm" position, at which time the circuit from cam 608 is completed through conductor 614, contacts 620 and 631, solenoid 624, and thence through the conductor 628 to the main line L². Irrespective of the positioning of the knob 104, the control circuit during the flush and agitate rinse periods is such that warm water only can be introduced into the tub 8. This circuit can be traced from the main line L¹, conductor 610, contacts 484 of switch 472, conductor 612 to contact 609 for the cam 606, the other contact for the cam 606 being connected through conductor 656 to the solenoid 624 and thence by way of conductor 628 to the main line L².

Water is introduced into the tub 8 until such time as a predetermined liquid level is attained, at which time the float 282 rises and contacts the control button 466 which moves the lever arm 468 about its pivot point 470 and at the same time moves the switch bracket 475 about its pivot points 476 and 478. This operation causes switch 474 to be energized which immediately completes a circuit for starting the timer motor 600 and the driving motor 160. This circuit may be traced through the main line L¹, conductor 632, contacts 486, conductor 634, conductor 636, conductor 638 to the field winding for the timer motor 600 and thence through the conductors 640 and 642 to the main line L². The circuit for the driving motor 160 is also completed through the switch 474 in the same manner as the circuit for the timer motor, the conductor 636 being connected by conductor 644 to the field winding for the motor 160 and thence through the conductors 646 and 642 to the main line L². Energization of these motor circuits starts the timer motor to operate whereby the cams rotated thereby take over control of the sequential operation of the machine. The driving motor 160 operates the driving mechanism heretofore described for oscillating the agitator 10, it being understood that at this time the tub 8 and the outer shaft 200 is maintained stationary by the brake shoes as previously described.

Preferably, the switches 472 and 474 in the circuit heretofore described are angularly off-set with respect to each other and the volume of mobile conducting fluid contained in the casings therefor is such that the motor circuits through the switch 474 are energized prior to the time when the level of the washing liquid within the tub 8 has attained a predetermined height found desirable for the washing operation, so that agitation of the clothes or other materials within the tub 8 is initiated prior to the time when the mixing valve 90 is closed. It will be apparent that because of the relative angular disposition of the switches 472 and 474 and the volume of mobile conducting material for the switches that a short time after agitation is effected switch 472 is deenergized which shuts off the flow of liquid into tub 8 independently of the operation of timer motor 600.

As the timer motor continues to operate, the cams 602, 604 and 606 are progressively moved to initiate a spin period during which time liquid is introduced into the tub 8 for flush rinsing the clothes or materials contained therein. At the end of the washing period, motor circuits through the contacts for cam 604 are completed for spinning the tub 8, these circuits being entirely independent of the switches 472 and 474. The circuit for the timer motor may be traced from the main line $L^2$ through conductors 642 and 640 to the field winding for the timer motor 600, thence through conductors 638 and 636 to one of the contacts for the control cam 604 and thence through the other contact therefor and conductors 648 and 650 to the main line $L^1$, thus completing a circuit whereby the timer motor continues to operate and to move its cams through their cycle of operation. The circuit for the drive motor 160 can be traced from the main line $L^2$, conductors 642 and 646, through the field winding for the motor 160, conductors 644 and 636 to one contact of the control cam 604 and thence from the other contact for said control cam through conductors 648 and 650 to the main line $L^1$.

A circuit is also completed at this time for energizing the solenoid 434 to release the brake shoes 406 and 408 and to move the lever 428 whereby its projection 438 is disengaged from the bell crank lever 356 to permit the clutch collar 354 to move downwardly under the action of gravity to effect an engagement of the key 352 and the operating end of the clutch spring 346. Thus the outer shaft 200 is operatively connected to the inner shaft 236 through the spring clutch element 346 whereby the tub 8 may be rapidly rotated for causing the washing liquid to be discharged from the clothes or material contained therein. This circuit can be traced from the main line $L^1$ through conductor 650 through one of the contacts of the control cam 602 through the other contact for the control cam through conductor 652 to the winding for the solenoid 434 and thence from the said winding through conductor 654 to the main line $L^2$.

During this period of spin, cam 606 is moved to complete a circuit whereby warm water is introduced through the mixing valve 90, conduit 454 and nozzle 462 into the tub 8. This circuit may be traced from the main line $L^1$, conductor 610, contacts 484 of switch 472 (which is in closed position when the tub 8 is empty), conductor 612 to one of the contacts of cam 606, the other contact for the cam 606 being connected by conductor 656 to the solenoid 624 of valve 90 and thence through conductor 628 to the line $L^2$, whereby the material and clothes are flush rinsed during the spinning operation.

Water overflowing from the tub 8 during the spinning operation is discharged into the outer tub 6 and flows through the discharge opening 148 and into the intake conduit 310 for the pump 304. This pump, operated through the belt 296, discharges the water extracted from the clothes or other material in the tub 8 through the conduit 312 to drain.

At the end of the spinning period hereinabove described, the circuit for the solenoid 434 is deenergized, thus allowing brake 365 to operate to hold the tub 8 stationary during the agitate rinse period. When the spinning period is terminated, control cam 606 causes a circuit to be completed through switch 472 whereby warm rinse water is introduced into the tub 8 while the tub is at rest. The circuit for the introduction of warm rinse water is the same as the circuit for introducing rinse water during the spinning period. After a predetermined liquid level has been attained in the tub 8, the float 282 engages the button 466 to energize switch 474 to complete a circuit as was done during the washing cycle to oscillate the agitator 10 and to deenergize switch 472.

As the timer motor 600 continues to operate, the operation of agitator 10 is discontinued, at which time the brake solenoid 434 is again energized through the circuit previously described for releasing the brake shoes 406 and 408 from the drum 416 and to again permit clutch element 346 to effect a driving connection between the inner shaft 236 and the outer shaft 200 whereby the motor 160 rapidly spins the tub 8 for extracting the rinse water from the clothes or other materials contained in the tub 8. The control circuit for the motor 160 at this time is independent of either of the switches 472 or 474 and is traced in the same manner as the circuit heretofore traced for the previous spin period.

At the end of the spin period, continued operation of the timer motor moves the control cams into their reset or inactive position, at which time the drive motor 160 is rendered inoperative and the brake solenoid 434 is deenergized whereby the brake shoes 406 and 408 engage the brake drum 416 to hold the tub 8 stationary and to recondition the entire control circuit for a repetition of the cyclic operation as hereinabove described.

The unbalance switch 498 is normally held in closed position by means of latch 489 when the lid 34 is in closed position. This unbalance switch is cut into the main line circuit $L^1$ so that so long as the switch is held in its closed position by the latch 489, the circuits hereinbefore described are sequentially completed for automatically operating the machine. Under most operating conditions, the clothes or other materials within the tub 8 are uniformly distributed to such an extent that no excessive lateral displacement of the tub takes place as the same is brought up to its spinning speed. There are occasions, however, where excessive eccentric loadings occur in the tub which will cause undesirable lateral displacement of the tub as the same is caused to rotate during a spinning period. In that event, the center post 272 engages the lever 488 to disengage latch 489 from the shoulder 500 whereby the switch 498 will drop downwardly about the pivot points 492 and 494 thus causing the switch to open and to deenergize the entire control circuit. When this happens, the circuit for the pilot light 70 is broken and the panel 68 is no longer illuminated, thus drawing to the attention of the operator the fact that the machine is no longer operating. Deenergization of the control circuit immediately deenergizes the brake solenoid 434 which causes the brake shoes 406 and 408 to immediately engage with the brake drum 416 to bring the tub 8 to a stop. The machine may be put back into operation again merely by the expediency of lifting the cover 34 which causes the switch 498 to pivot about its pivot points 492 and 494 so that latch 489 will engage the shoulder 490. When the lid 34 is again closed the switch 498 completes the control circuit and the machine then continues in its cycle of operation.

It is also to be noted that the unbalance switch 498 also serves to prevent the operator from opening the lid for manipulation of the clothes or material contained in the tub 8 during the entire washing cycle. This prevents the operator from contacting any moving parts of the machine during its operation.

In the operation of the washing and drying machine according to the disclosure heretofore presented, the operator opens the lid 34 and places the clothes or other material to be washed into the tub 8 and then pours the proper quantity of detergent into the said tub. The lid is closed and the water temperature is selected by positioning the water selector knob of the control for the mixing valve 90. If medium hot water is desired, the temperature selecting knob on the top of the machine is positioned as shown in Figure 25 of the drawings. The timer control knob, also mounted on the top or cover of the cabinet, may be pulled outwardly to close the line switch 96 after which the same is rotated to a position corresponding to the length of time desired for the washing period as shown by indicia on the knob. This is the only manual operation that is required by the operator.

When the timer control knob is turned, cam 608 for the timer is turned to a position whereby water is supplied by the mixing valve 90 to the tub 8 through conduit 454 and nozzle 462. Water continues to flow into the tub 8 until such time as the float 282 rises and engages button 466 to move the switch 474 to closed position, all as hereinbefore explained. This energizes the timer and drive motor circuits whereby the timer starts to operate for rotating the control cams driven thereby to effect a cycle of operation in accordance with the operation of the control circuit. At this time the brake is deenergized so that brake shoes 406 and 408 are in engagement with the brake drum 416 to hold the tub 8 and the outer shaft 200 stationary and, because of the positioning of the operating lever 428 of the brake mechanism, its extension 438 is in engagement with the bell crank lever 356 whereby the key 352 is out of engagement with the operating end of the spring clutch element 346. Accordingly, the motor 160 operating through its belt 296 rotates pulley 300 and through the constant torque slip clutch assembly hereinbefore described, the inner shaft 236 is rotated to oscillate the agitator 10 through the oscillating mechanism disposed within the casing 194. Because of the particular construction of switches 472 and 474 and their relative angular disposition, water will continue to be introduced into the receptacle 8 until a predetermined desired liquid level is attained. This level is determined by optimum washing conditions within the tub 8 and although it has been pointed out that a lag may exist between the time when the switch 474 is energized and switch 472 is deenergized, nevertheless, under certain circumstances it may be desirable to have such energization and deenergization of these switches occur substantially simultaneously which would result in causing agitation to take place in the tub 8 simultaneously with the discontinuance of flow of liquid from the mixing valve 90. Under the conditions of operation assumed in the illustrative embodiment of the invention, water will continue to flow for a short time into the tub 8 although agitation for washing has already started through the operation of switch 474.

After the agitator has been operated to effect a washing operation within the tub 8 for a predetermined length of time, continued rotation of the control cams 602 and 604 completes circuits for spinning the tub for a predetermined length of time, during which time water is introduced through the mixing valve 90 to flush rinse the clothes or material contained therein. One of such circuits is controlled by cam 602 and includes the solenoid 434, as previously traced, which energizes the same to release the brake shoes 406 and 408 from drum 416 and at the same time causes the projection 438 to disengage the bell crank lever 356 whereby the collar 354 drops to permit key 352 to engage with the operating end of the spring clutch element 346. The other of the circuits is controlled by the cam 604 and includes the motor 160. This circuit is independent of switches 472 and 474. The motor 160, accordingly, continues to operate to drive the outer shaft 200 from the inner shaft 236 through the clutch element 346. Such rotation of the outer shaft 200 causes the entire tub assembly connected thereto to rotate while the agitator 10 is maintained stationary with respect to the tub. As the speed of rotation of the tub 8 increases and the water therein is forced up along the side walls 162, the same is discharged over the upper edge of the tub into the bottom of the stationary tub 6 where the same is discharged through the outlet 148 to drain.

The provision of maintaining water in the tub 8 during the first part of the spin period is important because it tends to maintain the tub 8 in a balanced condition at this time. Thus, for example, if the material is not equally or uniformly distributed about the tub, as will be more common in the majority of cases, the tub, as it is brought up to its operating speed of rotation, will move in a horizontal plane or wobble about its vertical axis and may, under certain conditions, be moved laterally to the extent where the same strikes the outer stationary tub 6 which may either cause damage thereto or prevent the tub 8 from accelerating to its normal operating speed of rotation. In other words, it would be very unlikely that the tub could be rotated through its critical speed. By maintaining the water within the tub 8, uneven distribution of the material becomes unimportant as the weight of the water will maintain the tub in a substantially perfect balance at this time. As the tub picks up speed it passes through a critical period of oscillation determined by the weight of the tub, the water and the material disposed therein, and the resiliency of the springs 402. The supporting springs 402 are for the purpose of keeping the tub centered and when the tub passes through its critical speed, there will be a tendency for the amplitude of the gyratory movement thereof to increase. Accordingly, it is necessary to provide means for dampening out such gyratory movement. This is effected by the stabilizing and damping assembly 234 mounted in association with the hollow shaft 200. As the spinning tub wobbles due to its out of balance condition, the hollow member 379 will move with the hollow shaft 200 thus causing the spherical surface provided on the friction element 394 to be moved over the spherical under-surface of the center portion 150 of the tub 6. The contacting surfaces of the friction elements 394 and the central portion 150 of the tub 6 being spherical, allow even and continuous contact between the same while the spherical member 388 is wobbling due to unbalanced loads in the tub 6.

In addition to the stabilizing effect of the damper mechanism 234 and the springs 402, the oscillating mechanism for the agitator has been located within the housing 194 associated with the bottom wall 164 of the tub 8 to provide a substantial mass located a considerable distance above the bearing support 206 which is utilized as a stabilizing mass to aid in the balancing of the tub and its contents during the period when the same is rapidly rotated. In addition to the location of such a stabilizing mass at an effective distance from the support 206, a still further balancing device in the form of the hollow toroidal shaped member 186 is provided and rigidly fastened to the tub 8 adjacent the top thereof. This balancing ring is partially filled with a heavy liquid and, if so desired, by steel wool or the like for damping the flow of liquid therein. The balancing ring is placed near the top of the tub 8 so that it will be most effective for each unit of weight of liquid provided inside the ring. The balancing device does not become effective on acceleration of the tub 8 until after the critical speed has been passed, but upon deceleration is effective through the critical speed of rotation. Above the critical speed the tub and its contents tend to rotate about a new center of gravity which is different from the geometrical center of the tub depending upon the unbalanced load therein. This shift in the center of rotation is toward the center of mass of the unbalanced load which causes the fluid in the hollow toroidal shaped member to move in the opposite direction, thereby tending to compensate for this unbalanced load condition. Due to the fact that under normal conditions there is water within the inner tub when the same starts to spin, this mass of water restricts the degree of wobble which might be caused by an unequal distribution of material. By properly selecting the springs 402 and the amount of friction created between the surfaces of the friction elements 394 and the surface of the central portion 150 of the stationary tub 6, as well as the mass of the tub 8 and the oscillating mechanism within the housing 194, the critical speed is held low enough so that there is still a large quantity of water within the tub 8 as it passes through its critical speed of rotation. This acts as a means for balancing the unbalanced load up to and through the critical speed of rotation of the tub, after which the balancing ring becomes effective to tend to maintain the tub in its normally vertical position. The critical speed is low enough so that when the tub reaches such speed, very little water in the tub has been thrown out of the same and as the tub is rotated past its critical speed, water is then finally thrown out of the tub and out of the material contained therein but at these speeds the balancing ring has taken over and once the balancing ring is activated above critical speed, it will tend to maintain the tub in substantially its vertical position as the same is rotated and decelerates through and below its critical speed of rotation.

During the spinning operation hereinabove described, warm water is introduced into the tub 8 through the mixing valve 90 to flush rinse the clothes therein, the circuit for the operation of the mixing valve 90 being completed through the switch 472, as hereinbefore described. It is at this time that fresh water is admitted to the rotating tub to remove a relatively high percentage of the soap remaining in the clothes after washing. This rinse water is discharged over the upper edge of the tub 8 into the tub 6 and then to drain by means of the pump 304.

At the termination of the spinning period, cam 602 causes deenergization of the solenoid circuit whereby the clutch element 346 is rendered inoperative and brake shoes 406 and 408 are set to bring the tub 8 to a stop. The inner shaft 236 is then free to be rotated independently of the outer shaft 200. At this time the circuit for the motor 160 and timer motor 600 is deenergized. Simultaneously with the deenergization of this circuit for the motors, cam 606 is effective to complete a circuit to initiate introduction of warm water into the tub 8 to be utilized in the agitate rinse period.

Water for this rinsing operation is introduced into the tub 8 until the float 282 is actuated to deenergize switch 472 and to energize switch 474. Energization of switch 474 completes the circuit, as previously described, to operate motor 160 and the timer motor 600 to cause the agitator 10 to be oscillated whereby the clothes or other materials within the tub 8 are thoroughly agitated for a brief period of time. Continued operation of the timer motor 600 positions cams 602 and 604 to complete circuits including the solenoid 434 and the motor 160 independently of the switches 472 and 474, as hereinbefore described, whereby the outer shaft 200 driven by the inner shaft 236 through the clutch element 346 and the tub 8 are gradually brought up to spinning speed to permit the material within the tub to be centrifuged until a large portion of the moisture has been removed therefrom. This completes the washing cycle after which the timer is moved into its reset or inactive position to deenergize the control circuit and to bring the tub 8 to rest. The lid 34 may then be raised by the operator to remove clothes or other materials from the tub 8. During this cycle of operation the material which was placed in the tub is subjected to a washing operation, a centrifuging action to remove water therefrom, a flush rinse to remove soapy water therefrom during rotation of the tub, a rinse followed by agitation, and finally a centrifuging action to remove a large percentage of water therein.

While the illustrative embodiment of the invention has been described in connection with a control circuit for operating the washing machine in a cycle of operation determined by the control cams of the timer motor, nevertheless, it will be clearly appreciated that it is possible to use the control device for the timer motor in such a way as to manually position the control cams for operating the various mechanisms incorporated in the machine. Furthermore, if so desired, the machine can be very readily made to operate semi-automatically.

While I have herein described and upon the drawings shown illustrative embodiments of the invention, it is to be understood that the invention is not limited thereto but may comprehend other constructions, arrangements of parts, details and features without departing from the spirit of the invention.

It is claimed:

1. A washing machine comprising a rotatable tub having a bottom wall adapted to receive liquid and material to be washed, a washing device disposed within said tub, a vertical downwardly extending supporting shaft, a casing secured intermediate the lower side of said bottom wall and the upper end of said shaft to provide the support for said rotatable tub, a source of power, and means driven by said source of power for operating said washing device and for rotating said tub through said casing, said means including mechanism mounted within said casing for oscillating said washing device when said tub is stationary and rotatable therewith when said tub is rotated.

2. In a washing machine, the combination of a rotatable tub having a bottom wall adapted to receive liquid and material to be washed, a casing on the lower side of said bottom wall extending laterally of the vertical axis thereof, an agitator mounted in said tub, a downwardly directed power shaft concentrically arranged with respect to the vertical axis of said tub, means driven by said power shaft including an outer concentrically arranged shaft for rotating said tub through said casing to extract liquid from material contained therein, means providing a support for said tub through said outer shaft and casing, and means providing a driving connection between said power shaft and said agitator, said means including mechanism mounted in said casing for operating said agitator when said tub is stationary and rotatable with said tub and casing when said tub is rotated.

3. A washing machine comprising a rotatable tub having a bottom wall adapted to receive liquid and material to be washed, a casing attached to the exterior of said bottom wall extending laterally of the vertical axis and rotatable with said tub, an agitator mounted in said tub, a downwardly directed power shaft concentrically arranged with respect to the vertical axis of said tub, means driven by said power shaft including an outer concentrically arranged shaft for rotating said tub through said casing to extract liquid from material contained therein, said casing providing a support for said tub through said outer shaft, and means providing a driving connection between said power shaft and said agitator, said means including mechanism mounted in said casing for oscillating said agitator when said tub is stationary and rotatable therewith to thereby utilize the weight of said mechanism and casing as a stabilizing means when said tub is rotated.

4. A washing machine comprising a rotatable tub having a bottom wall adapted to receive liquid and material to be washed, a casing on the lower side of said bottom wall extending laterally of the vertical axis and rotatable with said tub, an agitator mounted in said tub, a downwardly projecting power shaft concentrically arranged with respect to the vertical axis of said tub, means driven by said power shaft including an outer concentrically arranged shaft for rotating said tub through said casing to extract liquid from material contained therein, said casing providing a support for said tub through said outer shaft, means adjacent the lower end of said outer shaft for supporting said tub for tilting movement, means providing a driving connection between said power shaft and said tub, and means for effecting a driving connection between said power shaft and said agitator, said last named means including mechanism mounted in said casing for oscillating said agitator when said tub is stationary and rotatable therewith to thereby utilize the weight of said mechanism and casing as a stabilizing means when said tub is rotated.

5. A washing machine comprising a rotatable tub having a bottom wall adapted to receive liquid and material to be washed, a casing secured on the lower side of said bottom wall, an agitator mounted in said tub, a power shaft concentrically arranged with respect to the vertical axis of said tub, means including an outer concentrically arranged shaft having its upper end secured to said casing for rotating said tub through said casing to extract liquid from material contained therein, spring clutch means for effecting a driving connection between said power shaft and said outer shaft, means providing a support for tilting movement of said tub adjacent the lower end of said outer shaft, and means for effecting a driving connection between said power shaft and said agitator, said last named means including oscillating mechanism mounted in said casing for oscillating said agitator when said tub is stationary and rotatable therewith to thereby utilize the weight of said mechanism and casing as a stabilizing means when said tub is rotated.

6. A washing machine comprising a rotatable tub having a bottom wall adapted to receive liquid and material to be washed, a casing secured to the lower end of said bottom wall, a washing device mounted in said tub, means including vertical shaft means for operating said washing device for effecting a washing operation within said tub, an outer concentric supporting shaft having its upper end secured to said casing and rotatable by said shaft means for rotating said tub through said casing to extract liquid from the material contained therein, said first mentioned means including oscillating mechanism disposed in said casing for oscillating said washing device when said tub is stationary and rotatable therewith to give added weight to said tub when the same is rotated, means providing a support for tilting movement of said tub adjacent the lower end of said shaft means, and means for resisting tilting movement of said tub about its support.

7. A washing machine comprising a rotatable tub having a bottom wall adapted to receive liquid and material to be washed, a casing secured on the lower side of said bottom wall, a washing device mounted in said tub, means including shaft means concentrically arranged with respect to the vertical axis of said tub for operating said washing device for effecting a washing operation within said tub, an outer concentric supporting shaft having its upper end secured to said casing and rotatable by said shaft means for rotating said tub through said casing to extract liquid from the material contained therein, said first named means including oscillating mechanism disposed laterally of the axis of said tub and in said casing for oscillating said washing device when said tub is stationary and rotatable therewith to give added weight to said tub when the same is rotated, means for supporting said tub for tilting movement about a point adjacent the lower end of said shaft means, and frictional means between said tub and supporting means for resisting tilting movement of said tub.

8. A washing machine comprising a rotatable tub having a bottom wall adapted to receive liquid and material to be washed, a casing secured to the lower side of said bottom wall, a washing device mounted in said tub, means including shaft means concentrically arranged with respect to the vertical axis of said tub for operating said washing device for effecting a washing operation within said tub, an outer concentric supporting shaft having its upper end secured to said casing and rotatable by said shaft means for rotating said tub through said casing to extract liquid from the material contained therein, said first named means including oscillating mechanism disposed laterally of the axis of said tub and in said casing for oscillating said washing device when said tub is stationary and rotatable therewith to give added weight to said tub when the same is rotated, means for supporting said tub for tilting movement about a point adjacent the lower end of said shaft means, cooperating friction elements between said tub and supporting means for resisting tilting movement of said tub, and means operable to center said shaft means and for maintaining the cooperating frictional engagement of said elements.

9. A washing machine comprising a rotatable tub adapted to receive liquid and material to be washed, a washing device mounted in said tub, power operated drive means including a plurality of shaft means, one of said shafts being operable to effect a washing operation of said washing device within said tub and another of said shafts being operable to rotate said tube to extract liquid from the material contained therein, said power operated drive means including a clutch to provide a driving connection between said shafts, means providing a support for tilting movement of said tub, brake means for applying a braking force to one of said shafts, and means for holding said brake means against torsional movement when said brake is applied.

10. A washing machine comprising a rotatable tub adapted to receive liquid and material to be washed, a washing device mounted in said tub, power operated drive means including a plurality of shaft means, one of said shafts being operable to effect a washing operation of said washing device within said tub and another of said shafts being operable to rotate said tub to extract liquid from the material contained therein, said power operated drive means including a clutch to provide a driving connection between said shafts, means providing a support for tilting movement of said tub, brake means for applying a braking force to one of said shafts, and means articulatedly connected to said brake means and operable in all positions of said tub for holding said brake means against torsional movement when said brake is applied.

11. A washing machine comprising a base structure, a rotatable tub adapted to receive liquid and material to be washed, a washing device mounted in said tub, power operated drive means including a plurality of shaft means, one of said shafts being operable to effect a washing operation of said washing device within said tub and another of said shafts being operable to rotate said tub to extract liquid from the material contained therein, said power operated drive means including a clutch to provide a driving connection between said shafts, means providing a support on said base structure for tilting movement of said tub, brake means for applying a braking force to one of said shafts, resilient means mounted on said brake means and base structure, and oppositely arranged link members mounted in said resilient means for connecting said brake means and base structure and operable in all positions of said tub for holding said brake means against torsional movement when said brake is applied.

12. A washing machine comprising a rotatable tub adapted to receive liquid and material to be washed, a washing device mounted in said tub, power operated drive means including a plurality of shaft means, one of said shafts being operable to effect a washing operation of said washing device within said tub and another of said shafts being operable to rotate said tub to extract liquid from the material contained therein, means for supporting said tub through said shaft means, said power operated drive means including a clutch to provide a driving connection between said shafts, brake means for applying a braking force to one of said shafts, and common means for controlling said clutch and brake means.

13. A washing machine comprising a rotatable tub adapted to receive liquid and material to be washed, a washing device mounted in said tub, power operated drive means including a plurality of shaft means, one of said shafts being operable to effect a washing operation of said washing device within said tub and another of said shafts being operable to rotate said tub to extract liquid from the material contained therein, means for supporting said tub through said shaft means for tilting movement, said power operated drive means including a spring clutch interposed between said shafts to provide a driving connection therebetween, brake means for applying a braking force to one of said shafts, means for controlling the operation of said clutch and said brake means, and means for holding said brake means against torsional movement when said brake is applied.

14. A washing machine comprising a base structure, a rotatable tub adapted to receive liquid and material to be washed, a washing device mounted in said tub, power operated drive means including a plurality of shaft means, one of said shafts being operable to effect a washing operation of said washing device within said tub and another of said shafts being operable to rotate said tub to extract liquid from the material contained therein, means for supporting said tub through said shaft means for tilting movement on said base structure, said power operated drive means including a spring clutch interposed between said shafts to provide a driving connection therebetween, brake means for applying a braking force to one of said shafts, means for controlling the operation of said clutch and said brake means, and oppositely arranged link members articulatedly connected to said brake means and base structure and operable in all positions of said tub for holding said brake means against torsional movement when said brake is applied.

15. A washing machine comprising a rotatable tub adapted to receive liquid and material to be washed, a washing device mounted in said tub, concentrically arranged inner and outer shafts one of which is adapted to operate said washing device to effect a washing operation of said washing device within said tub and the other of which is adapted to rotate said tub to extract liquid from the material contained therein, means for driving said shafts, means providing a support for tilting movement of said tub, friction damper means for resisting tilting movement of said tub, and brake means for applying a braking force to one of said shafts, said brake means comprising a brake shoe supporting member supported by said friction damper means and a brake drum secured to said one of said shafts.

16. A washing machine comprising a rotatable tub adapted to receive liquid and material to be washed, a washing device mounted in said tub, concentrically arranged inner and outer shafts one of which is adapted to operate said washing device to effect a washing operation of said washing device within said tub and the other of which is adapted to rotate said tub to extract liquid from the material contained therein, means for driving said shafts, means providing a support for tilting movement of said tub, friction damper means for resisting tilting movement of said tub, brake means for applying a braking force to one of said shafts, said brake means comprising a brake shoe supporting member supported by said friction damper means and a brake drum secured to said one of said shafts, and means articulatedly connected to said brake shoe supporting member and operable in all positions of said tub for holding said brake means against torsional movement when said brake is applied.

17. A washing machine comprising a rotatable tub adapted to receive liquid and material to be washed, a washing device mounted in said tub, concentrically arranged inner and outer shafts one of which is adapted to operate said washing device to effect a washing operation of said washing device within said tub and the other of which is adapted to rotate said tub to extract liquid from the material contained therein, means for driving said shafts, means providing a support for tilting movement of said tub, friction damper means comprising cooperating friction members for resisting tilting movement of said tub, brake means for applying a braking force to one of said shafts, said brake means comprising a brake shoe supporting member supported by one of said friction members and a brake drum secured to said one of said shafts, and means for centering said one of said friction members and the brake shoe supporting member connected thereto and for maintaining the cooperating frictional engagement of said friction members.

18. A washing machine comprising an outer stationary tub having an opening in the bottom wall thereof, an inner rotatable tub adapted to receive liquid and material to be washed, a washing device mounted in said tub, concentrically arranged inner and outer shafts extending through said opening, one of said shafts being adapted to operate said washing device to effect a washing operation of said washing device within said tub and the other of said shafts being adapted to rotate said tub to extract liquid from the material contained therein, means for driving said shafts, means providing a support for tilting movement of said tub, a damper member having frictional engagement with the bottom wall of said stationary tub for resisting tilting movement of said tub, brake means for applying a braking force to one of said shafts, said brake means comprising a brake shoe supporting member supported by said damper member and a brake drum secured to said one of said shafts, means articulatedly connected to said brake shoe supporting member and operable in all positions of said tub for holding said brake means against torsional movement when said brake is applied, and means providing a liquid tight seal between the bottom wall of said stationary tub and said outer shaft.

19. A washing machine comprising an outer stationary tub having an opening in the bottom wall thereof, an inner rotatable tub adapted to receive liquid and material to be washed, a washing device mounted in said tub, inner and outer shafts concentrically arranged with respect to the vertical axis of said inner tub and extending through the opening in said bottom wall, means including said inner shaft for operating said washing device to effect a washing operation within said inner tub, means including said outer shaft for rotating said inner tub to extract liquid from material contained therein when said inner shaft is connected in driving relation thereto, clutch means for connecting said shafts in driving relation, means providing a support for tilting movement of said tub, a damper member embracing said outer shaft and having frictional engagement with the bottom wall of said stationary tub for resisting tilting movement of said inner tub, brake means comprising brake shoes and a supporting member therefor mounted on said damper member and a brake drum secured to said outer shaft, electrically controlled means carried by said brake shoe supporting member for operating said clutch and said brake shoes, means for centering said damper member and the brake shoe supporting member connected thereto and for maintaining the cooperating frictional engagement of said damper member and bottom wall of said outer tub, means articulatedly connected to said brake shoe supporting member and operable in all positions of said tub for holding said brake means against torsional movement when said brake is applied, and means providing a liquid-tight seal between the bottom wall of said stationary tub and said outer shaft.

20. A washing machine comprising a rotatable tub having a bottom wall adapted to receive liquid and material to be washed, a casing secured to the lower side of said bottom wall, a washing device disposed within said tub, drive means for operating said washing device to effect a washing operation within said tub and for rotating said tub through said casing to extract liquid from the material contained therein, means providing a support for tiltable movement of said tub about a point remote from said tub, damper means intermediate said support and tub for resisting tilting movement of said tub, and brake means intermediate said support and tub for applying a braking force to resist rotational movement of said tub, said drive means for said washing device including mechanism disposed in said casing for oscillating said washing device when said tub is stationary and rotatable therewith to give added rotational inertia to said tub.

21. A washing machine comprising a rotatable tub having a bottom wall adapted to receive liquid and material to be washed, a casing securing to the lower side of said bottom wall, a washing device disposed within said tub, drive means for operating said washing device to effect a washing operation within said tub and for rotating said tub through said casing to extract liquid from the material contained therein, means providing a support for tiltable movement of said tub about a point remote from said tub, damper means intermediate said support and tub for resisting tilting movement of said tub, brake means intermediate said support and tub for applying a braking force to resist rotational movement of said tub, said drive means for said washing device including mechanism disposed in said casing for oscillating said washing device when said tub is stationary and rotatable therewith to give added rotational inertia to said tub, and balancing means associated with the top of said tub.

22. A washing machine comprising a rotatable tub having a bottom wall adapted to receive liquid and material to be washed, a casing secured to the lower side of said bottom wall, a washing device disposed in said tub, a source of power, means including an inner shaft driven by said source of power for operating said washing device to effect a washing operation within said tub, means including an outer shaft having its upper end secured to said casing for rotating said tub through said casing to extract liquid from the material contained therein, means providing a support for tiltable movement of said tub about a point adjacent the lower end of said outer shaft, clutch means intermediate said support and tub whereby said outer shaft is driven by said inner shaft, damper means intermediate said support and tub for resisting tilting movement of said tub, and brake means intermediate said support and tub for applying a braking force to resist rotational movement of said tub, said drive means for said washing device including mechanism disposed in said casing for oscillating said washing device when said tub is stationary and rotatable therewith to give added rotational inertia to said tub.

23. A washing machine comprising a rotatable tub having a bottom wall adapted to receive liquid and material to be washed, a casing secured to the lower side of said bottom wall, a washing device disposed in said tub, a source of power, means including an inner shaft driven by said source of power for operating said washing device to effect a washing operation within said tub, means including an outer shaft having its upper end secured to said casing for rotating said tub through said casing to extract liquid from the material contained therein, means providing a support for tiltable movement of said tub about a point adjacent the lower end of said outer shaft, clutch means intermediate said support and tub whereby said outer shaft is driven by said inner shaft, damper means intermediate said support and tub for resisting tilting movement of said tub, brake means intermediate said support and tub for applying a braking force to resist rotational movement of said tub, said drive means for said washing device including mechanism disposed in said casing for oscillating said washing device when said tub is stationary and rotatable therewith to give added rotational inertia to said tub, and balancing means associated with the top of said tub.

24. A washing machine comprising a rotatable tub having a bottom wall adapted to receive liquid and material to be washed, a casing secured to the lower side of said bottom wall, a washing device disposed in said tub, a source of power, means including a vertical inner shaft driven by said source of power for operating said washing device to effect a washing operation within said tub, means including an outer shaft having its upper end secured to said casing for rotating said tub through said casing to extract liquid from the material contained therein, means providing a support for tiltable movement of said tub about a point at the lower end of said outer shaft, clutch means intermediate said support and tub whereby said outer shaft is driven by said inner shaft, brake means intermediate said support and tub for applying a braking force to resist rotational movement of said tub, and means for resisting torsional movement of said brake means irrespective of the position of said tub, said first named means including mechanism disposed in said casing for oscillating said washing device when said tub is stationary and rotatable therewith to give added rotational inertia to said tub.

25. A washing machine comprising a rotatable tub having a bottom wall adapted to receive liquid and material to be washed, a casing secured to the lower side of said bottom wall, a washing device disposed within said tub, a source of power, means including a vertical inner shaft driven by said source of power for operating said washing device to effect a washing operation within said tub, means including an outer shaft having its upper end secured to said casing for rotating said tub through said casing to extract liquid from the material contained therein, means providing a support for tiltable movement of said tub about a point adjacent the lower end of said outer shaft, clutch means intermediate said support and tub whereby said outer shaft is driven by said inner shaft, brake means intermediate said support and tub for applying a braking force to resist rotational movement of said tub, means for resisting torsional movement of said brake means irrespective of the position of said tub, said first named means including mechanism disposed in said casing for oscillating said washing device when said tub is stationary and rotatable therewith to give added rotational inertia to said tub, and balancing means associated with the top of said tub.

26. A washing machine comprising a rotatable tub having a bottom wall adapted to receive liquid and material to be washed, a casing secured to the lower side of said bottom wall, a washing device disposed within said tub, drive means including a vertical inner shaft for operating said washing device to effect a washing operation within said tub, a vertical outer concentric shaft having its upper end secured to said casing for rotating said tub through said casing to extract liquid from the material contained therein, means providing a support for tiltable movement of said tub about a point adjacent the lower end of said outer shaft, damper means intermediate said support and tub for resisting tilting movement of said tub, centering means for said shafts and said damper means, brake means intermediate said support and tub for applying a braking force to resist rotational movement of said tub, means for resisting torsional movement of said brake means irrespective of the position of said tub, said drive means for said washing device including mechanism disposed in said casing for oscillating said washing device when said tub is stationary and rotatable therewith to give added rotational inertia to said tub, and balancing means associated with the top of said tub.

27. In a washing machine, the combination of a rotatable tub adapted to receive liquid and material to be washed, a washing device disposed within said tub, means including inner and outer concentrically arranged shafts for operating said washing device to effect a washing operation within said tub and for rotating said tub to extract liquid from the material contained therein, means providing a support for tiltable movement of said tub about a point in spaced relation thereto, clutch means disposed between said tub and support for connecting said shafts including a spring clutch element disposed between said shafts, an actuating key for said spring clutch element slidable within a slot provided in said outer shaft, a clutch collar slidably mounted on said outer shaft for supporting said key and normally acting under the action of gravity to position said key in the path of movement of the free operating end of said spring clutch element, and means for holding said collar in inoperative position.

28. In a washing machine, the combination of a rotatable tub adapted to receive liquid and material to be washed, a washing device disposed within said tub, means including inner and outer concentrically arranged shafts for operating said washing device to effect a washing operation within said tub and for rotating said tub to extract liquid from the material contained therein, means providing a support for tiltable movement of said tub about a point in spaced relation thereto, clutch means disposed between said tub and support for connecting said shafts including a spring clutch element disposed between said shafts, an actuating key for said spring clutch element slidable within a slot provided in said outer shaft, a clutch collar slidably mounted on said outer shaft for supporting said key and normally acting under the action of gravity to position said key in the path of movement of the free operating end of said spring clutch element, means for holding said collar in inoperative position, and electrical control means for controlling said last named means.

29. In a washing machine, the combination of a rotatable tub adapted to receive liquid and material to be washed, a washing device disposed within said tub, means including inner and outer concentrically arranged shafts for operating said washing device to effect a washing operation within said tub and for rotating said tub to extract liquid from the material contained therein, means providing a support for tiltable movement of said tub about a point in spaced relation thereto, clutch means disposed between said tub and support for connecting said shafts including a spring clutch element disposed between said shafts, an actuating key for said spring clutch element slidable within a slot provided in said outer shaft, a clutch collar slidably mounted on said outer shaft for supporting said key and normally acting under the action of gravity to position said key in the path of movement of the free operating end of said spring clutch element, brake means for applying a braking force to resist movement of said tub, said brake means including a brake drum and brake shoes cooperating therewith, and means for operating said brake shoes, said means having means for controlling the operation of said clutch collar.

THOMAS R. SMITH.

References Cited in the file of this patent

UNITED STATES PATENTS

| Number | Name | Date |
|---|---|---|
| 1,679,419 | Geyer | Aug. 7, 1928 |
| 1,714,496 | Chilton | May 28, 1929 |
| 1,772,845 | Schroeder | Aug. 12, 1930 |
| 1,931,624 | Schwarze | Oct. 24, 1933 |
| 1,940,880 | Pitter | Dec. 26, 1933 |
| 2,041,464 | Frantz | May 19, 1936 |
| 2,053,932 | Zimarik | Sept. 8, 1936 |
| 2,062,668 | Krauss | Dec. 1, 1936 |
| 2,148,330 | Tokheim | Feb. 21, 1939 |
| 2,167,086 | Page | July 25, 1939 |
| 2,224,241 | Verdier | Dec. 10, 1940 |
| 2,273,566 | Faber | Feb. 17, 1942 |
| 2,298,905 | Skinner | Oct. 13, 1942 |
| 2,302,012 | Dyer | Nov. 17, 1942 |
| 2,331,897 | Dyer | Oct. 19, 1943 |
| 2,346,158 | Dyer | Apr. 11, 1944 |
| 2,346,259 | Hutchings | Apr. 11, 1944 |
| 2,346,668 | Dunham | Apr. 18, 1944 |
| 2,346,669 | Dunham | Apr. 18, 1944 |
| 2,361,767 | Hays, Jr. | Oct. 31, 1944 |
| 2,372,769 | De Remer | Apr. 3, 1945 |
| 2,445,268 | Hadgins | July 13, 1948 |
| 2,453,367 | Giblin | Nov. 9, 1948 |
| 2,461,078 | Page | Feb. 8, 1949 |
| 2,485,622 | Bariffi | Oct. 25, 1949 |
| 2,498,179 | Oliver et al. | Feb. 21, 1950 |
| 2,568,614 | Fields | Sept. 18, 1951 |